United States Patent [19]

Pommerening et al.

[11] 3,943,297
[45] Mar. 9, 1976

[54] ELECTRONIC PRIVATE AUTOMATIC BRANCH EXCHANGE

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Jan. 9, 1974

[21] Appl. No.: 431,928

[52] U.S. Cl. .... 179/18 GF; 179/18 FG; 179/27 CA
[51] Int. Cl.² .......................................... H04Q 3/52
[58] Field of Search ....... 179/18 AD, 18 FG, 18 ES, 179/18 FF, 18 AB, 18 GF, 18 EA, 27 CA, 99, 18 GE

[56] References Cited
UNITED STATES PATENTS

| | | | |
|---|---|---|---|
| 3,197,568 | 7/1965 | Wedmore et al. | 179/27 CA |
| 3,221,108 | 11/1965 | Seemann et al. | 179/27 CA |
| 3,513,263 | 5/1970 | Bastian et al. | 179/18 AD X |
| 3,649,767 | 3/1972 | Muroga et al. | 179/18 ES |
| 3,760,361 | 9/1973 | Leger et al. | 340/166 R |
| 3,769,462 | 10/1973 | Russell et al. | 179/18 AD |
| 3,786,194 | 1/1974 | Pinede et al. | 179/18 AD |
| 3,789,151 | 1/1974 | Richards | 179/18 GF |
| 3,828,314 | 8/1974 | Bradbery et al. | 340/166 R |
| 3,832,495 | 8/1974 | Hovagimyan et al. | 179/18 GF |
| 3,843,845 | 10/1974 | Ridley | 179/99 |

*Primary Examiner*—Thomas W. Brown
*Attorney, Agent, or Firm*—Donald R. Antonelli; William F. Porter, Jr.

[57] ABSTRACT

An electronic private automatic branch exchange is built around a space divided solid state matrix. One side of the solid matrix provides line appearances which are connected to line circuits, tone receivers, senders and operator loops. The other coordinate side of the matrix provides junctor appearances for connection to an attendant junctor, local junctors and trunk junctors. The solid state switching matrix is a single stage matrix providing direct connection between line appearances and junctor appearances by the closing of a single crosspoint, and connection between lines within the system is effected simply by the interconnection of a pair of crosspoints associated with the respective lines and a selected junctor, thereby providing a greatly decreased switching for establishing a connection through the matrix. The control necessary for effecting such connections is provided with much simpler common control equipment than is utilized in a conventional multistage switching network.

37 Claims, 31 Drawing Figures

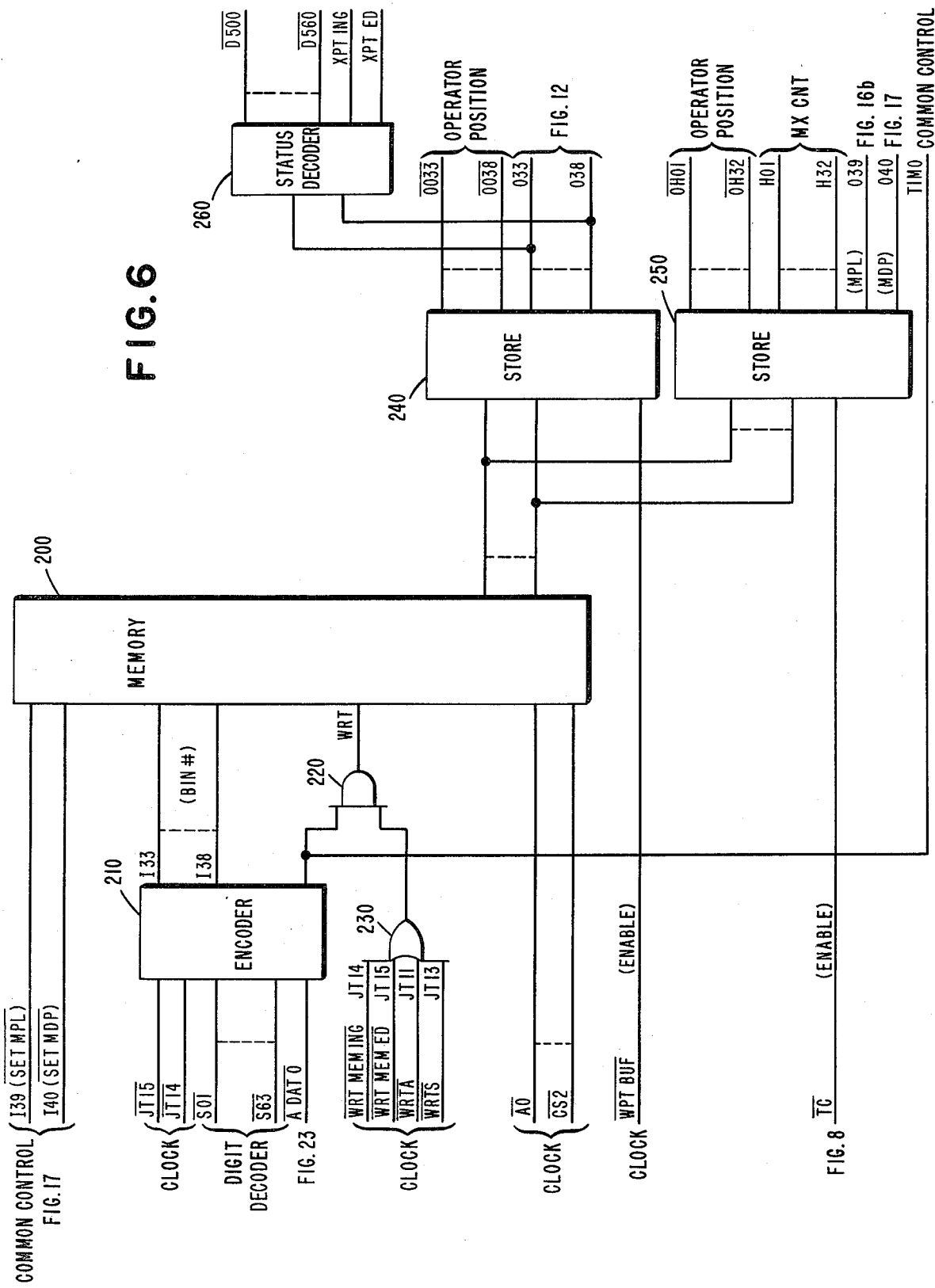

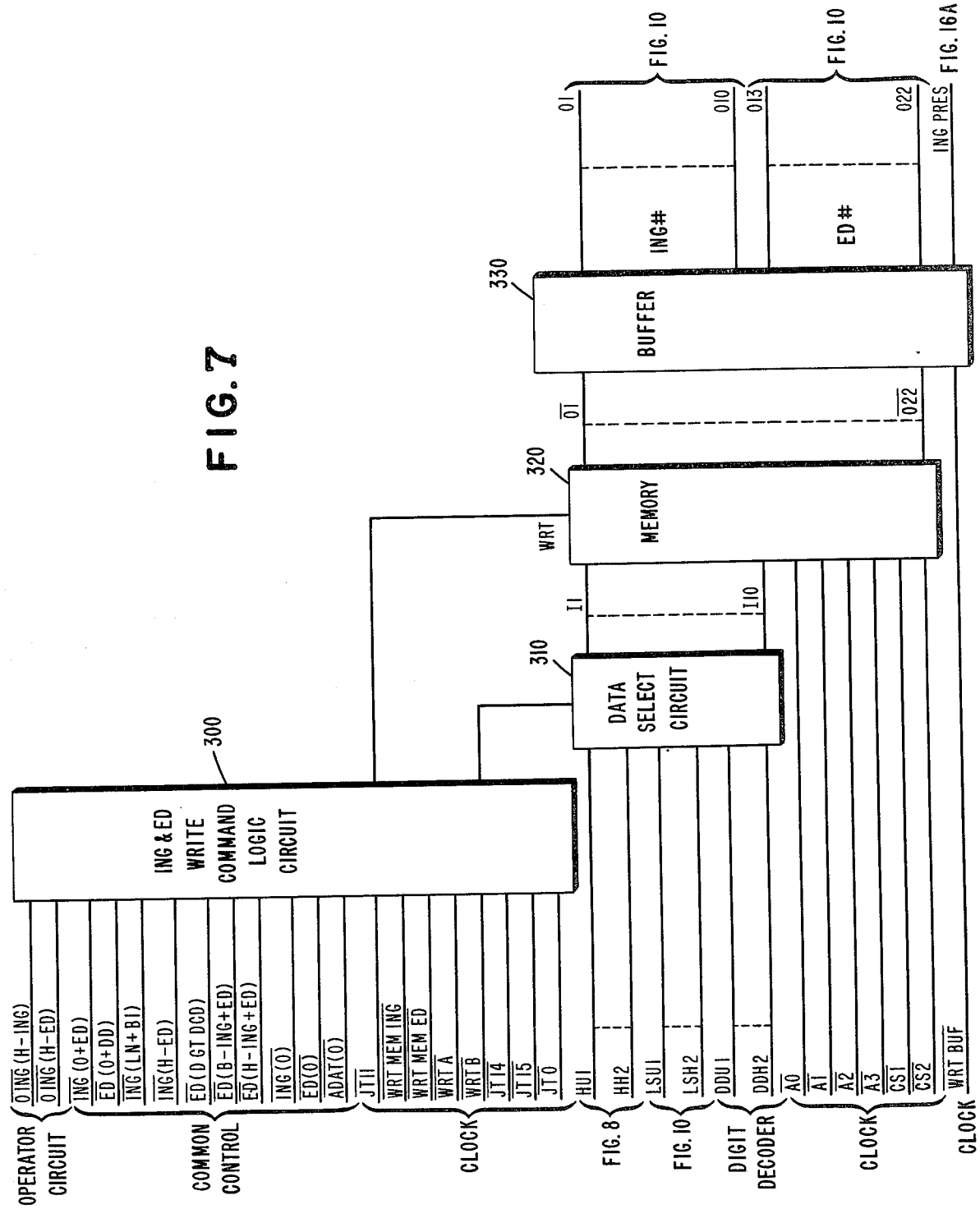

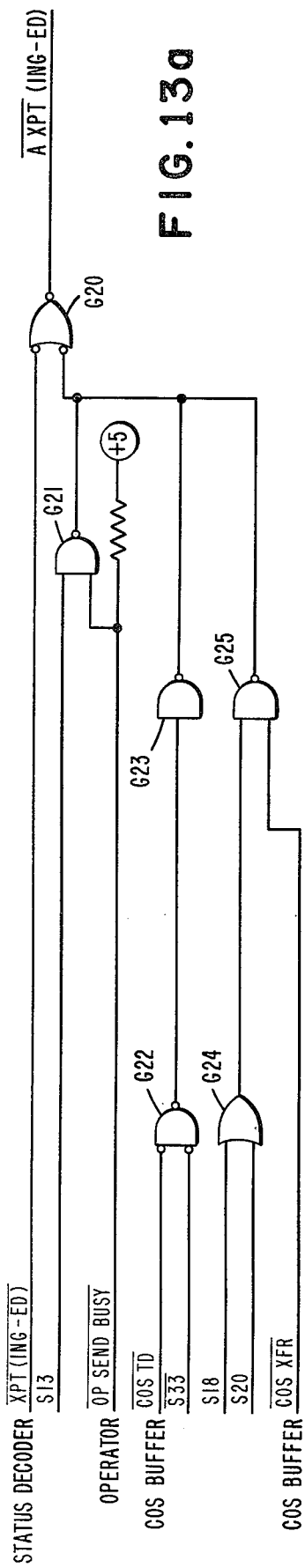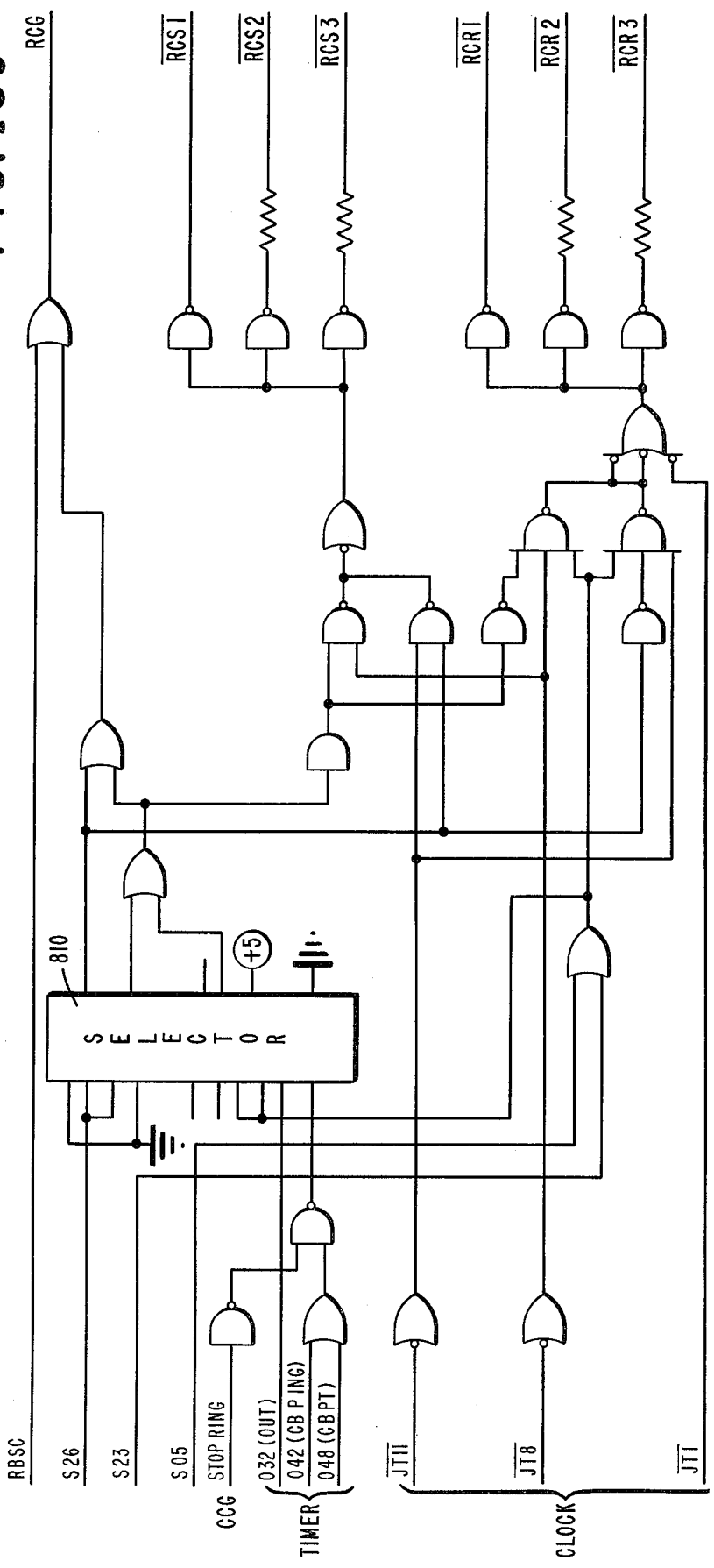
FIG.13a
FIG.13c

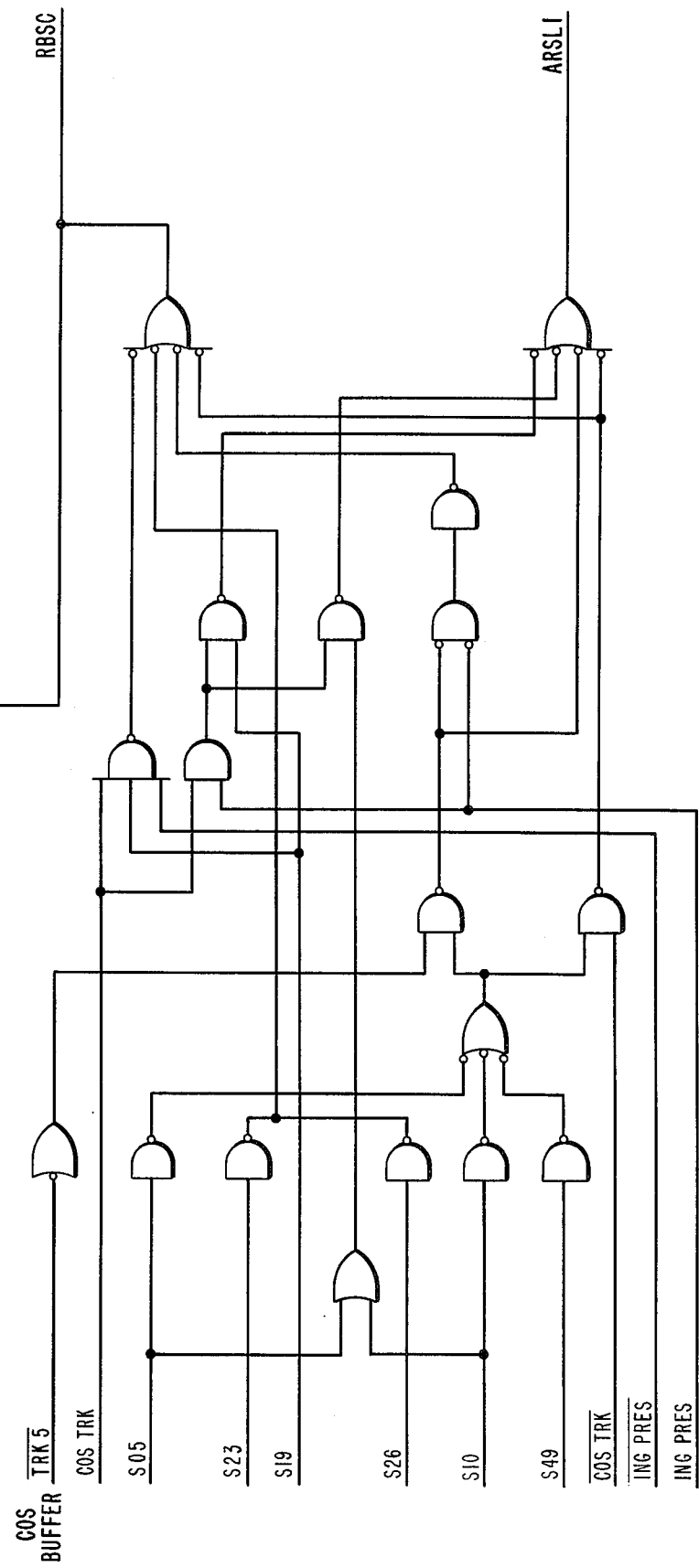

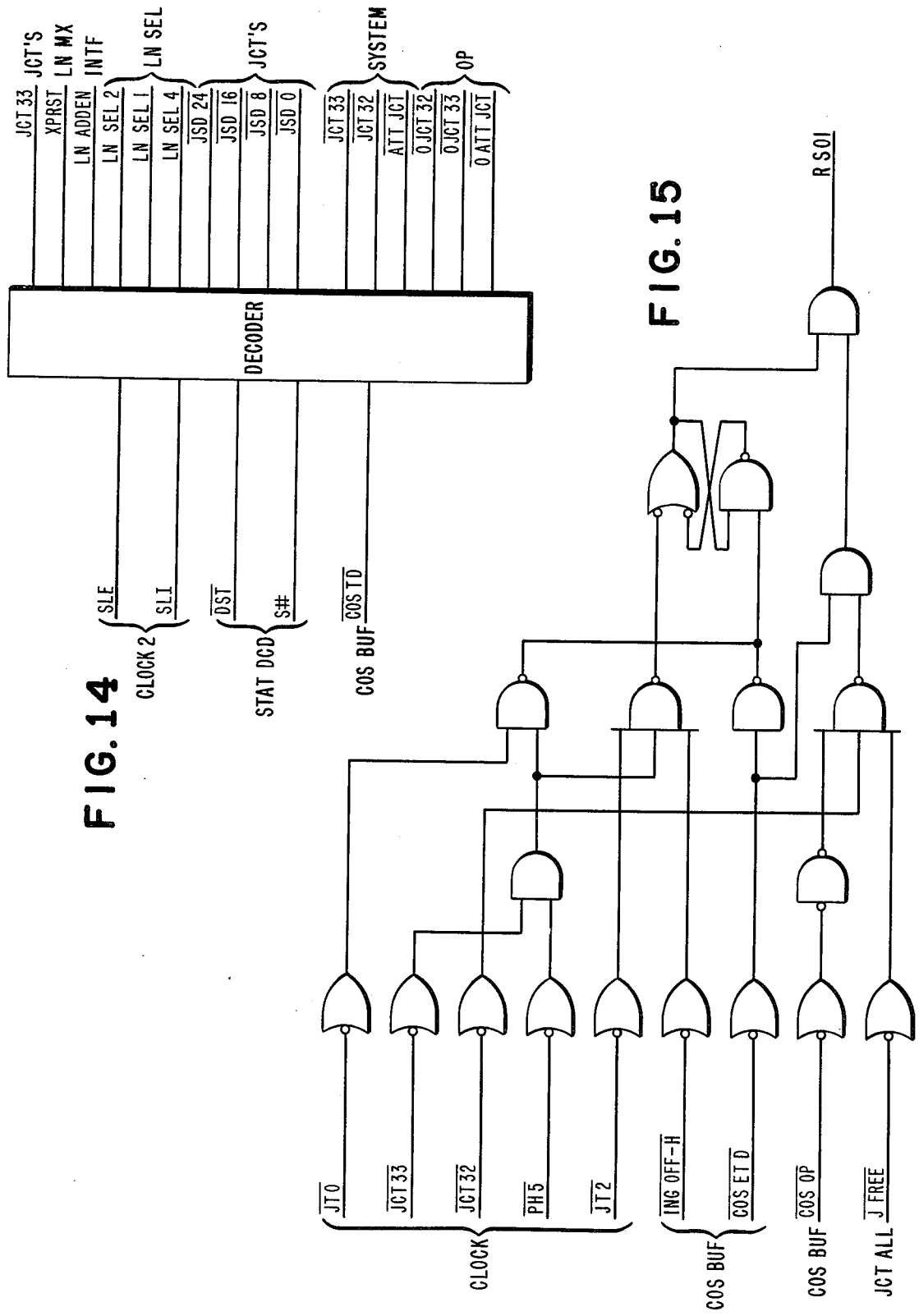

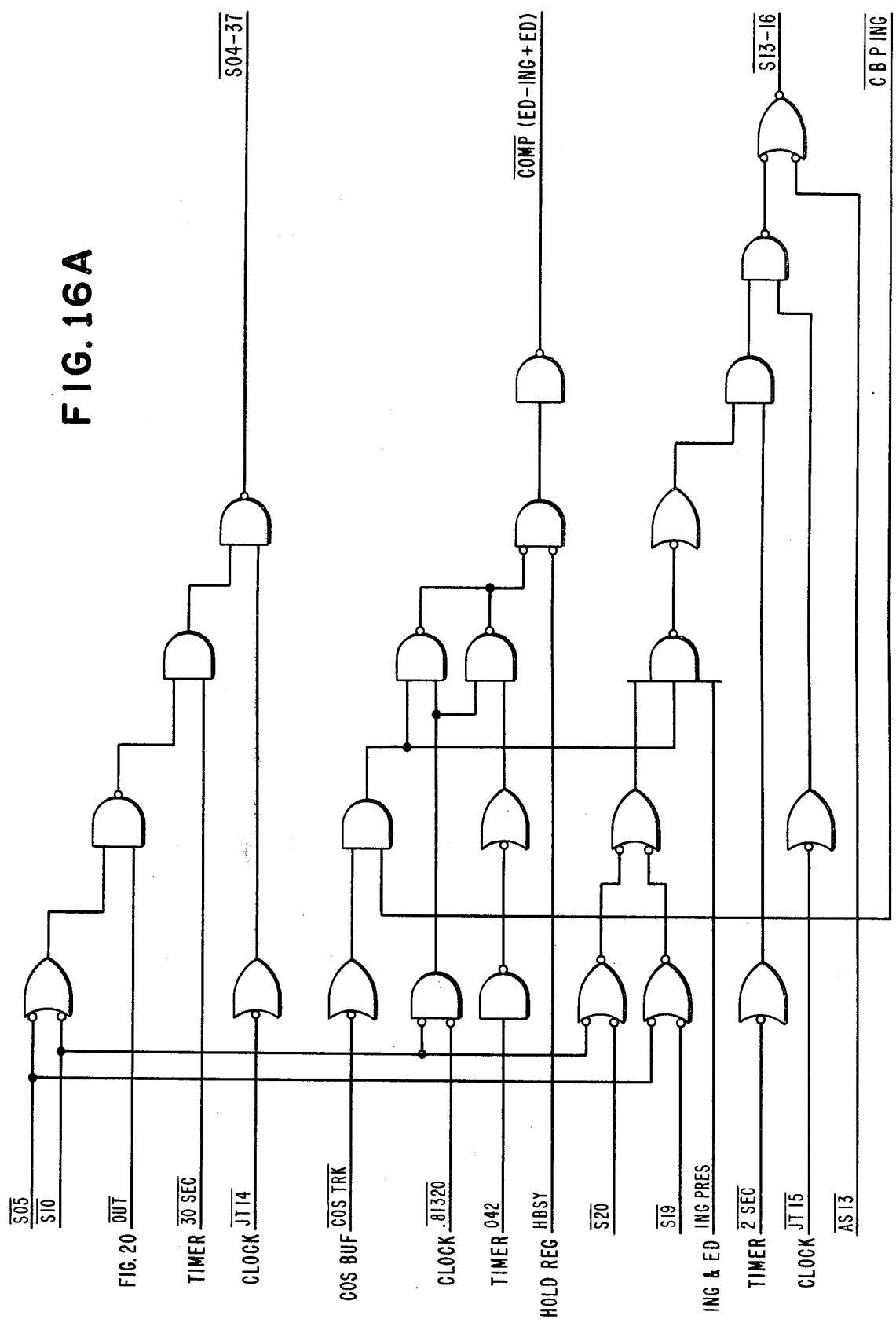

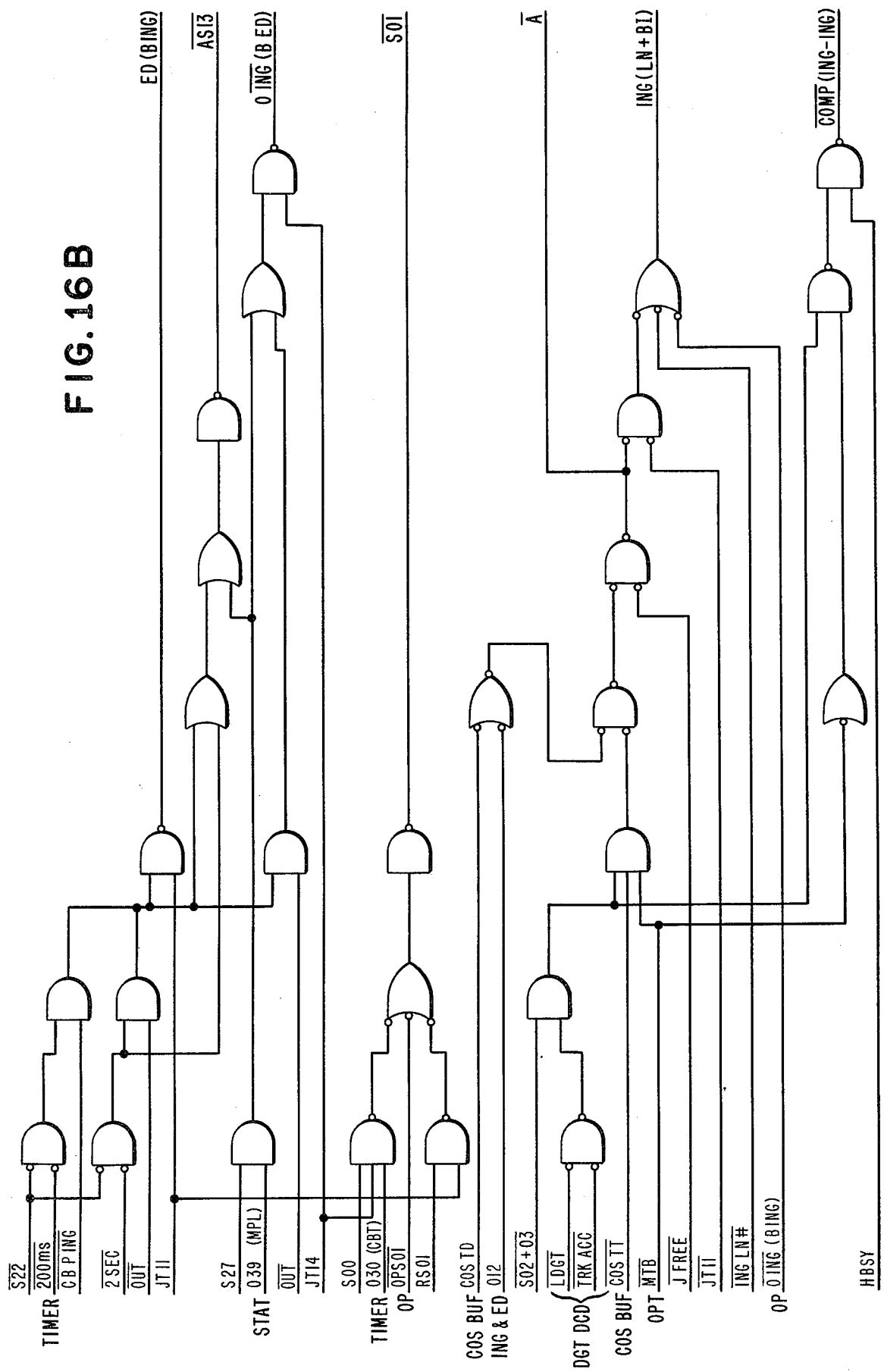

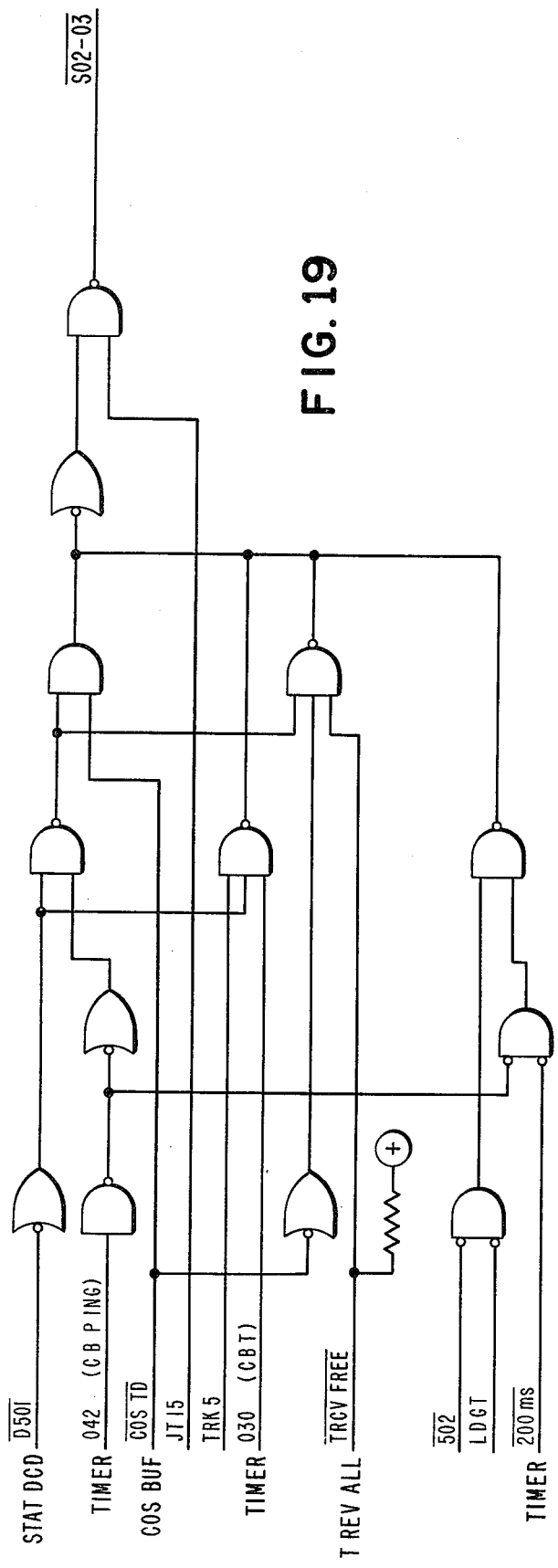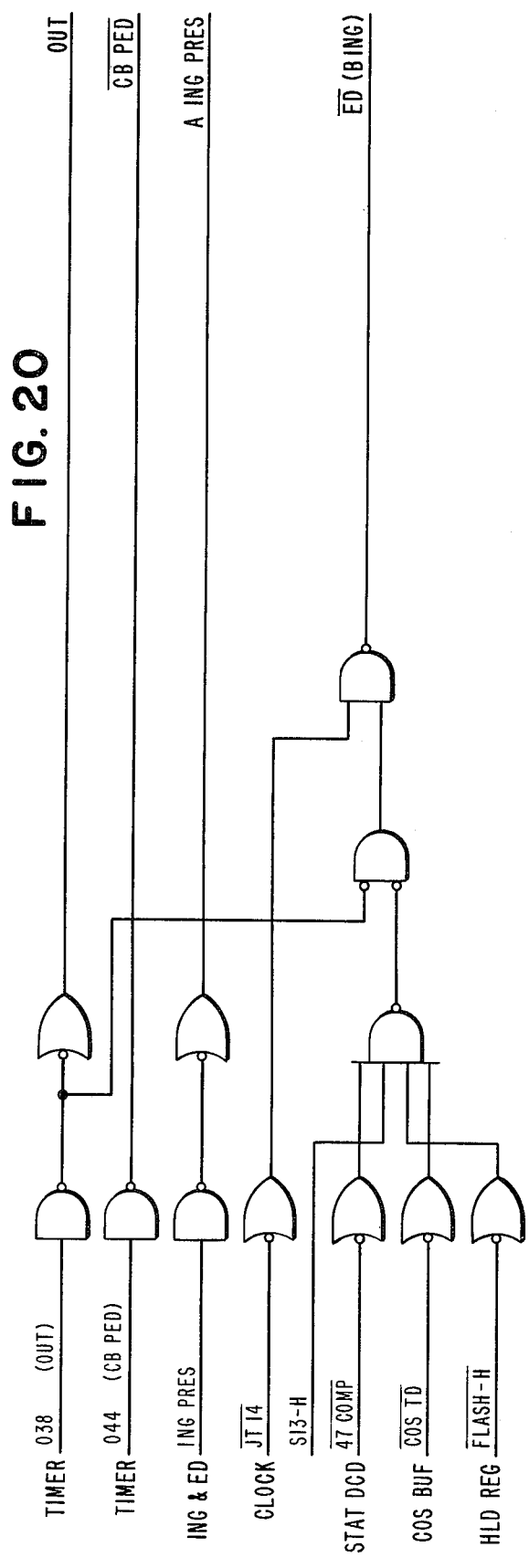
FIG.19
FIG.20

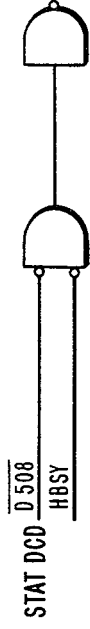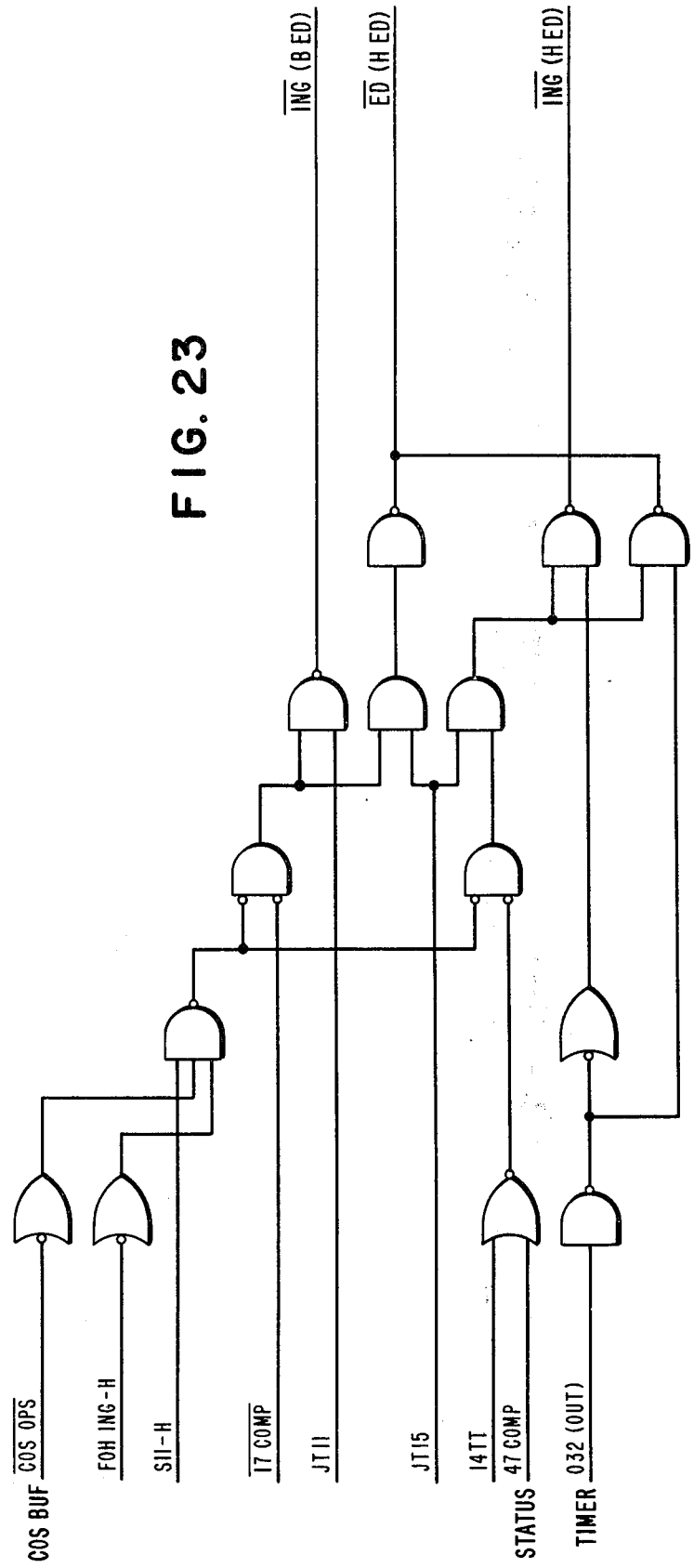
FIG.22
FIG.23

ELECTRONIC PRIVATE AUTOMATIC BRANCH EXCHANGE

The present invention relates in general to telephone systems, and more particularly to an electronic private automatic branch exchange.

Continuing efforts are being made in the telephone industry to produce exchange equipment of a more compact structure which is capable of mass production at lower costs, while at the same time providing for increased reliability and speed of operation. Continuous efforts ar also being made to provide equipment which is more dependable in operation and less subject to misoperation due to interference, cross-talk and other similar problems.

As a result of these objectives, the industry has recently experimented with solid-state switching networks, which are considerably more compact and less expensive to manufacture than the presently used electromagnetic switching networks. In this regard, switching networks made up of four layer diode type electronic cross points have been developed; however, to date, such networks have proven to be unsatisfactory for a number of reasons, including poor noise performance. Such four layer diode networks typically include sleeve control cross points wherein a holding current is provided through the cross point acting as the sleeve lead through the network to maintain the communication connection through the cross points of the network. Interruption of the holding current through the cross point due to noise, like in mechanical systems or relay type cross point systems, results in a break in the communication connection through the matrix and a consequent losing of the call. In addition, the so-called "rate effect" associated with diode control which results in an inadvertent closing of a cross point has become a serious problem with such networks.

Telephone systems typically include switching networks for establishing connection between line circuits or trunk circuits and common control equipment, which networks commonly take the form of a concentrator wherein a plurality of line circuits or trunk circuits is selectively connected over one of a number of possible paths through the network to a lesser number of common control elements. Such concentrator networks have plural switching stages to provide multiple paths between the large number of inputs and the smaller number of outputs. By providing such networks as integrated systems formed of solid state cross points, faster switching times than presently available with electromagnetic switches are accomplished, but the path-finding operations through such networks require rather complicated common control equipment and add to the time required for interconnection of an input to a selected output through the network. Thus, while an increase in the switching time of the network is accomplished by providing such networks as integrated circuits with solid state cross points, the equally important considerations of system complexity and optimum switching time are not met to the fullest extent.

As a solution to the numerous problems associated with present solid state switching networks, especially those formed as an integrated network of four layer diode type cross points, there has been disclosed in copending application S.N. 232,031, filed Mar. 6, 1972, by Glen L. Richards, now U.S. Pat. No. 3,789,151, issued Jan. 29, 1974, a solid state cross point switch made up of a pair of saturated transistors. This solid state cross point switch provides a low impedance path through the collector-emitter of the respective switching transistor for passing audio signals between a selected input and output lead pair by driving the two switching transistors associated therewith into saturation from a gated control circuit responsive to appropriate control signals. Such a cross point switch has numerous advantages over the conventional four layer diode type cross point in that it operates at a higher speed than the diode cross point and is not subject to misoperation due to noise or "rate effect" since the switching transistors are positively controlled by gated control signals applied thereto.

It is an object of the present invention to provide a telephone system utilizing a solid state switching matrix utilizing solid state cross point switches formed by positively controlled saturated transistors.

It is a further object of the present invention to provide an electronic private automatic branch exchange including a solid state switching matrix formed by integrated circuit techniques which has an extremely high speed of operation and a correspondingly high reliability and dependability of operation.

It is another object of the present invention to provide an electronic private automatic branch exchange which takes advantage of the use of the simplified solid state switching matrix to perform control functions normally requiring expensive and complicated common control equipment, thereby simplifying the overall system construction and provide a compact system which is capable of inexpensive mass production.

A further object of the present invention is to provide an electronic private automatic branch exchange which displays substantially constant current minimal power demands as a result of the fact that signaling functions can be performed at logic type levels rather than the relatively high signal levels required in present systems.

BRIEF DESCRIPTION OF THE INVENTION

The present invention is directed to an electronic private automatic branch exchange which is built around a space divided rectangular solid state switching matrix. One side of the switching matrix provides line appearances which are connected to line circuits, tone receivers, senders and operator loops. The other coordinate side of the matrix provides junctor appearances for connection to an attendant junctor, local junctors and trunk junctors. This solid state switching matrix is a single stage matrix providing direct connection between line appearances and junctor appearances by closing of a single cross point, while connection between lines within the system is effected simply by the interconnection of a pair of cross points associated with the respective lines and a selected junctor. Thus, the switching time required for establishing a connection through the matrix is greatly decreased as compared to multistage switching networks presently in use and the control necessary for effecting such connections may be accomplished with much simpler common control equipment.

The present invention also includes the use of a solid state switching matrix in the form of a tone matrix having appearances for connection to dial tone and ring-back tone sources along one side and junctor appearances for connection through the junctors to the primary matrix along the other coordinate side thereof.

With such an arrangement, the system does not require tone interrupters for ring-back tone, busy tone, etc. The interruptions of the tones are accomplished by suitable control of the cross points in the tone matrix, thereby further simplifying the common control equipment required in the system.

In conventional private branch exchanges, whenever a trunk is being switched to the operator, the trunk has a separate operator access and splits the tip and ring leads into tip-ring front and tip-ring rear, while two pairs of tip and ring leads are brought down to the operator loop circuits. Any split functions required by the operator are accomplished in the loop circuits and position circuits of the system. Therefore, the loop circuits and position circuits in such systems are quite complex. However, in the system of the present invention, because of the fast switching capability of the solid state cross point of the switching matrix, the split functions in the system are performed with the matrix cross points. This makes it possible to design smaller trunk circuits because a separate outlet for access to the operator is not required. The regular trunk outlet, which normally is switched to the line circuits in a trunk-to-line call is also used for switching to the operator.

With the system of the present invention, the operator loop circuits may be provided in the form of line circuits, with the result that switching a trunk to a line or to an operator is essentially the same function as far as the system is concerned. Since loop circuits are basically line circuits, the loop circuitry is therefore relatively simple.

A further feature of the present invention relates to the fact that the operator position circuitry in response to the common control accesses the associated junctor in an operator type call. The junctor in turn controls the cross points in the switching matrix for the required split functions. Because of this simple operation, the equipment necessary for special trunks, like information trunks, is not required in the system. The junctor performs the information trunk duties without requiring extra equipment. Also, special access trunks for the operator, which are usually quite complex, are not required. The junctor circuit designated as the attendant junctor also takes care of this function.

In addition, due to the elimination of information trunk hardware, tandem operation for operator extended calls to trunks between information trunks and the central office trunks is not required. The operator can be accessed by the line via the local junctor which acts as the information trunk, and when the operator extends the call to a central office trunk, the local junctor is dropped and the central office trunk junctor over the duties.

A further feature of the present invention relates to the fact that the cross points in the solid state switching matrix are of the type which are constantly controlled in a positive manner by appropriate control signals derived from the common control to ensure that the cross points are closed or open, as required. The cross points are constantly addressed either by the line scanner or by the line selector in the common control. The common control constantly scans the junctors and the lines and as each line or junctor is addressed, the cross points associated therewith are addressed. Addressing of the cross points alone results in an automatic release of the cross point. However, addressing of the cross points with proper control from the common control to indicate that the cross points should be closed results in a closing of the cross point. Therefore, in the system of the present invention, due to the line scanner action and the continuous addressing of the cross points by the line selector in the common control, cross points which are incorrectly closed will be quickly released, while open cross points which should be closed will be quickly closed. The scanning times involves are of such speed that an incorrect state in a cross point will be immediately corrected without any noticeable effect upon the communication connections through the matrix.

The basic system in accordance with the present invention includes a clock circuit which imposes upon the system a rigid time sequence for operation of the various component elements thereof in accordance with predetermined programs. The clock system generates distinct junctor time slots with each junctor time slot being subdivided into junctor slots for individual control functions. The system steps continuously in its scan of all junctors during a recurring time frame. In each junctor time, any calling or called line circuit associated with the junctor is addressed to obtain therefrom on a common bus signals indicating the condition of the line from which the status of the line and request for service can be decoded. At the end of each complete scan of the junctors, the line scanner addresses a single one of the line circuits to determine whether a request for service is present, the line scanner stepping to the next line circuit at the end of each complete scan of the junctors. By this means, the line scanner steps through all line appearances and thereby continuously scans the line circuits while all of the junctors are being scanned in between each addressing of the respective line circuits.

Based upon the line and junctor scans, the system works to allot a local junctor to any line going off-hook and a status circuit maintains a record of the state of that line circuit in a memory time associated with the particular junctor. In accordance with the state of the call, the common control circuits step the status of the particular line circuit from one program to the next until a communication connection is established from the line circuits through the switching matrix either to another line, the operator, or to an outgoing trunk.

Each time a local junctor is scanned, the system performs functions as prescribed by the status of the line circuit and the conditions as stored within the junctor memory. If it becomes necessary to change junctors during the course of establishment of the communication connection, such as in the case of an outgoing trunk call where switching between a local junctor and a trunk junctor is required once the destination of the call is determined, then the other junctors are either randomly addressed for information change or a temporary memory in the form of a hold register is used. A junctor associated with a communication connection through the switching matrix remains in connection with the line circuit or circuits involved throughout the call, and at the end of the call, the junctor memory is cleared and the particular junctor released.

Each trunk has a fixed assigned junctor in the form of a trunk junctor. If a trunk goes off-hook, it automatically has a junctor and the system can then perform from thereon in the same fashion as when a line circuit is involved.

These and other features, objects and advantages of the present invention will become clear from the following detailed description of a preferred embodiment of the present invention presented in connection with the accompanying drawing, wherein:

FIGS. 1a and 1b, in combination, form a schematic block diagram of the electronic private automatic branch exchange of the present invention;

FIG. 6 is a schematic block diagram of the status circuit;

FIG. 7 is a schematic block diagram of the junctor memory;

FIGS. 13a through 13e are schematic diagrams of the logic portion of the matrix control;

FIG. 14 is a block diagram of a decoder circuit associated with the line selector; and FIGS. 15, 16A, 16B, and 17 through 23 are schematic circuit diagrams of logic circuits included in the control circuits of the common control.

PREFERRED EMBODIMENT OF THE INVENTION

Figure 1A:
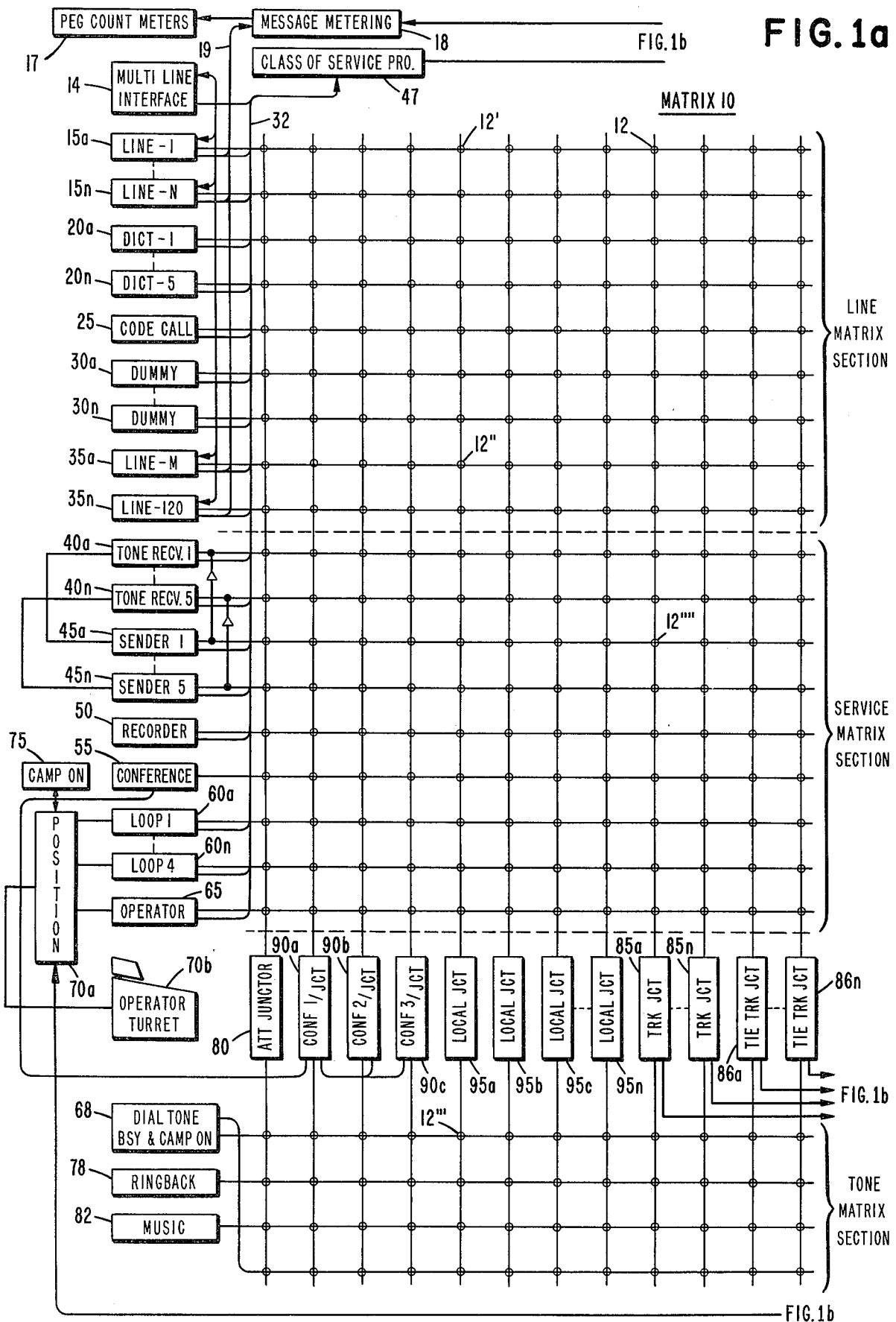

The heart of the electronic private automatic branch exchange of the present invention is a switching matrix 10 formed by integrated circuit techniques of a plurality of solid state cross point switches of the type disclosed in the aforementioned co-pending application Ser. No. 232,031 of Glenn L. Richards. The matrix 10 is a single stage rectangular array of cross points divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15a through 15n and 35a through 35n. Between the line circuits there are provided connections to special lines which take the place of regular lines in the system. These special lines are dictation access circuits 20a through 20n, a code call circuit 25 and a plurality of dummy line tie trunks 30a through 30n.

Line appearances at the service matrix section take the form of a plurality of tone receivers 40a through 40n, a plurality of register senders 45a through 45n, an intercept recorder 50, a conference bridge 55, a plurality of operator loop circuits 60a through 60n and an operator line circuit 65. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1. The junctor appearances are associated with an attendant junctor 80, a plurality of conference junctors 90a through 90c, a plurality of local junctors 95a through 95n, a plurality of trunk junctors 85a through 85n and a plurality of tie trunk junctors 86a through 86n. The trunk junctors 85a through 85n are connected to corresponding trunks 89a through 89n, and the tie trunk junctors 86a through 86n are associated with corresponding tie trunks 87a through 87n.

The tone matrix section of the matrix 10 provides inputs on respective lines from a combined dial tone generator and busy-camp-on tone generator 68, along with inputs from a ring-back tone generator 78 and music source 82. The outputs of the tone matrix section are connected through the respective junctors to the junctor appearances of the line and service matrix sections of the matrix 10.

The operator complex includes in addition to the loop circuits 60a through 60n and the operator line circuit 65, an operator position circuit 70a to which is connected an operator turret 70b. A camp-on circuit 75 providing a special feature in the system is also connected to the operator position circuit 70a. As another special feature of the system, a message metering circuit 18 and one or more peg count meters 17 are associated with the line circuits via a bus 19.

The matrix 10 functions to selectively connect an input from a line to a selected junctor by closing the appropriate cross point in the line matrix section and to provide an appropriate tone through the selected junctor to the line by closing the appropriate cross point in the tone matrix section. Connection from one line to another line is also effected by closing the pair of cross points in the line matrix section associated with the respective lines and a common junctor.

Figure 2:
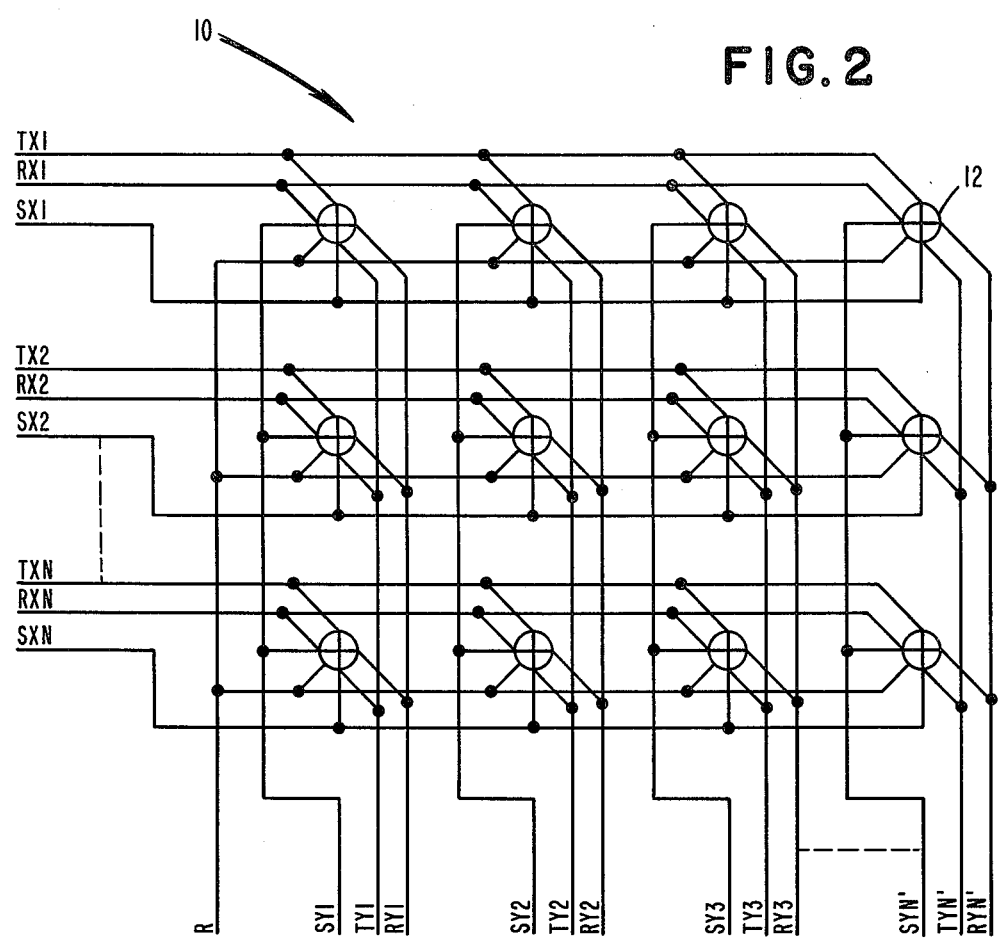
FIG. 2 is a schematic diagram of a portion of a switching matrix utilizing an array of solid state cross point switches as provided in the system of FIG. 1.

FIG. 2 provides a detailed illustration of a portion of the matrix 10 made up of an array of solid state cross point switches 12 wherein each individual switch 12 interconnects a particular pair of horizontal tip and ring leads TX and RX, respectively, with a particular pair of vertical tip and ring leads TY and RY, respectively. In normal operation, each cross point switch 12 provides a high impedance path between the horizontal and vertical lead pair it interconnects, thereby effectively blocking the passage of any audio signal and d.c. current flow therethrough. When it is desired to pass an audio signal between a particular horizontal lead pair TX and RX and a particular vertical lead pair TY and RY, respectively, the appropriate cross point switch 12 is selectively enabled by simultaneously applying appropriate control signals to horizontal control lead SX and a vertical control lead SY, which are uniquely associated with that particular cross point switch 12 chosen for operation, as well as a mark on the R lead.

Each horizontal lead paid TX and RX has an individual horizontal control lead SX associated therewith, and each vertical lead pair TY and RY has an individual vertical control lead SY associated therewith. Consequently, any cross point switch 12 can be selectively enabled by applying control signals to the horizontal and vertical control leads uniquely associated with the particular switch. Each of the control signals consist of a single momentary pulse which once applied to the horizontal and vertical control leads SX and SY, respectively, actuates the switch 12 and is thereafter removed leaving the switch 12 in a low impedance state. When it is desired to restore the high impedance connection, the switch 12 is disabled by applying the same control signals to the same horizontal and vertical control leads SX and SY, one without applying a control signal to a lead R which is connected to all the cross point switches 12.

Figure 3:
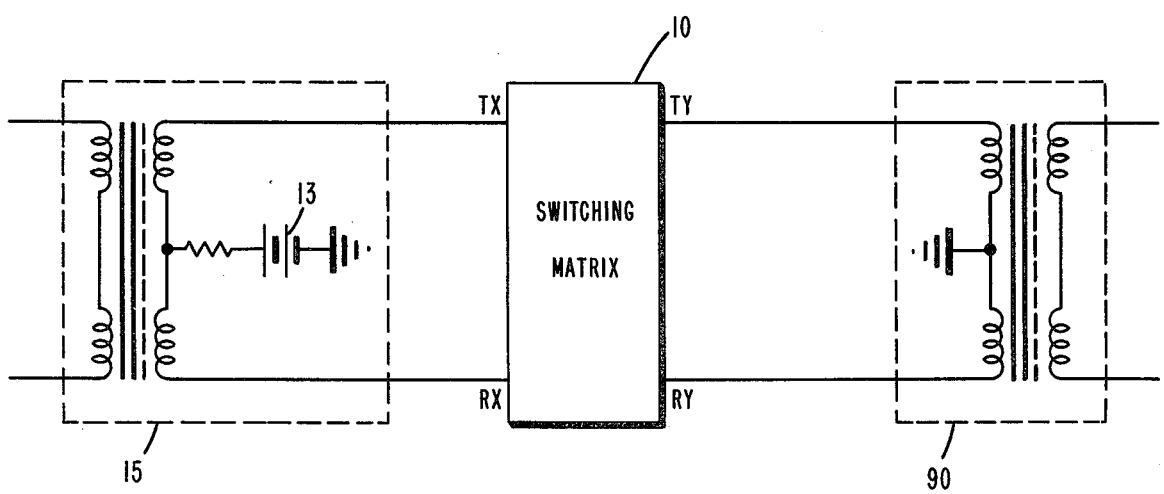
FIG. 3 is a schematic diagram illustrating a single tip and ring line connection to the switching matrix.

The switching matrix 10 is used solely for establishing an audio path between subscribers via the tip and ring leads. The typical tip and ring lead interconnection through the matrix is illustrated in FIG. 3, wherein the tip leads TX and TY and the ring leads RX and RY are interconnected in a single connection including balanced transformer bridges onto which audio signals are transposed. Direct current power is supplied from a battery 13 connected between the center tap of the windings of the transformer bridge in the line circuit 15, for example, and ground connected to the center tap of the transformer in the junctor circuit 90, for example. This basic type of interconnection and biasing arrangement is well known in the art.

As already indicated, the matrix 10 is designed to carry only the audio communication between lines or between a line and a trunk. The signaling associated with the establishment of the communication connection through the matrix 10 is handled outside of the matrix via a commun bus 32 through a class of service programmer 47 connected to the common control equipment 100.

Figure 1B:
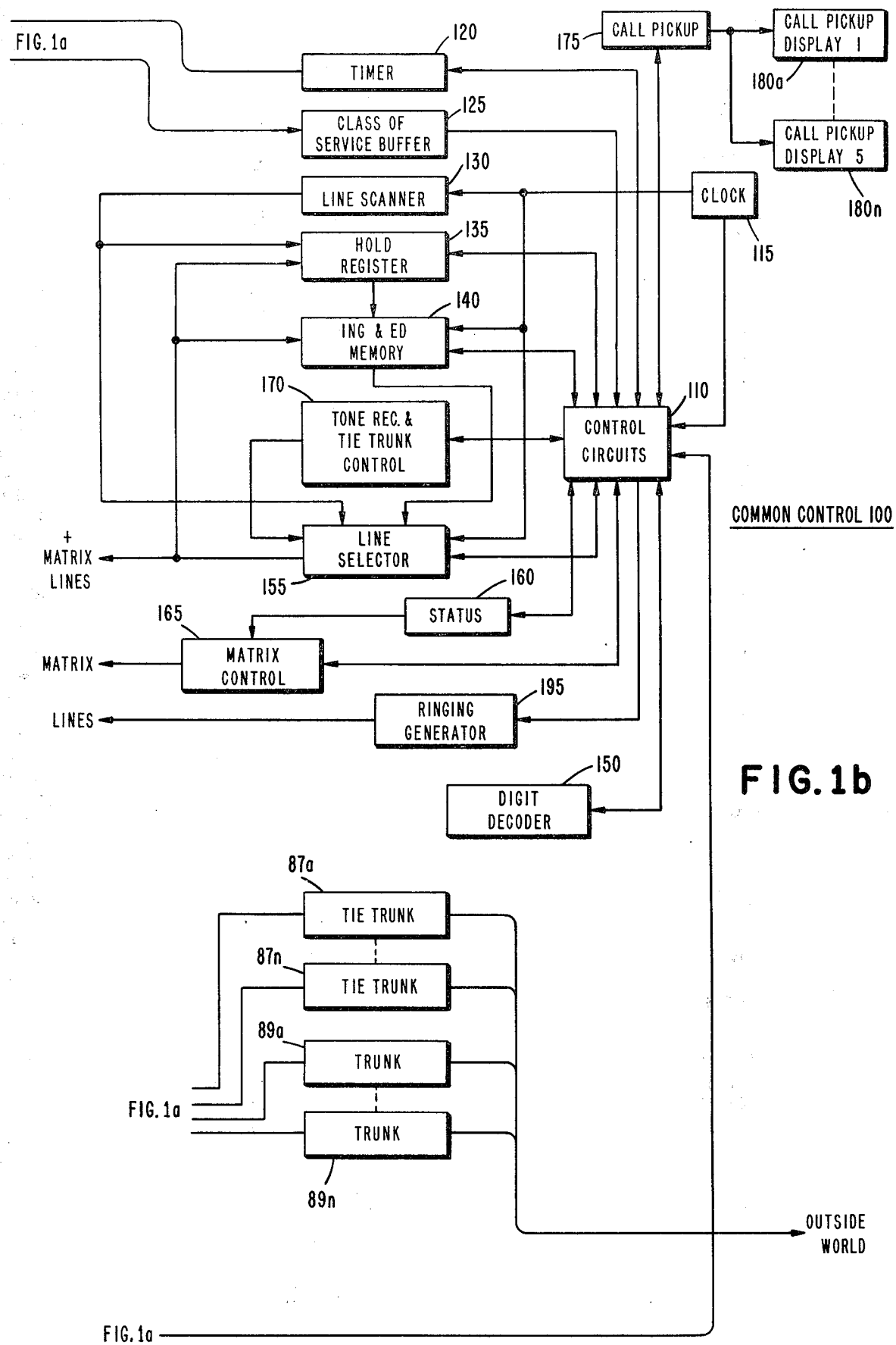

FIG. 1b schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions with the system. For example, on-hook and off-hook timing, time-outs, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line conditions which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scaning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes an ing and ed memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identify of the cross points in the matrix 10 associated with the line or lines involved with the junctor can be identified.

A line selector 155 receives line designations from the line scanner 130 and from the junctor memory 140, and in response to the clock signals from the block 115 selectively addresses cross points in the matrix 10 and selected lines at the proper times. As already indicated in connection with the description of the solid state cross point matrix 10, addressing alone of the cross point will open the cross point, while addressing in combination with a positive request for actuation of the cross point will close the cross point. Whether or not the cross point is to be opened or closed is determined by the status of the call based upon the progress of the connection as determined by the control circuits 110 from the information derived from the lines via the class of service programmer 47 and class of service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the cross point, i.e., whether it is to be open or closed, is derived from the status circuit 160. If the cross point which is addressed from the line selector 155 is to be closed for a particular call, a matrix control 165 will receive information from the status circuit 160 to this effect and generate a positive request signal for closing of the cross points. If the cross points are not to be closed, the matrix control 165 will produce no output as the cross points are addressed, thereby effecting an automatic opening of the cross points.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system and reducing the costs thereof.

The digit decoder 150 performs analysis of the incoming digits and makes decisions concerning these received digits. For example, the digits received by the digit decoder 150 are analyzed for line-to-line calls, line-to-line calls, toll restrictions and other information. The information provided by the digit decoder 150 then serves to initiate various control functions within the control circuits 110 as the various states of the call progress.

As a special feature, the system also provides a transfer circuit 170 which effects transfer between lines and between trunks and lines, as may be required.

A further special feature of the present invention is embodied in a call pickup arrangement including a call pickup circuit 175 and a plurality of call pickup displays 180a through 180n. In accordance with this special feature of the present invention, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class of service programmer 47 along with class of service information concerning that line circuit to the common control 100. Assuming that the line circuit 15a has gone off-hook and is requesting service, this line will ultimately be addressed by the line selector when the line scanner 130 reaches this line in its scan of all of the lines. At the same time, the line selector 155 will also address all of the cross points of the matrix 10 associated with that line circuit. In this case, all of the cross points associated with the line circuit 15a along the first horizontal of the matrix including the cross point 12' will be addressed. If, as a result of some misoperation, one or more of these cross points has been inadvertently closed, the addressing of the cross points at this time will automatically open the cross points in the absence of positive control from the matrix control 165 indicating that one or more of these cross points should be closed. Since line 15a has just requested service, none of the cross points should be closed and therefore the status circuit 160 will provide no indication to the matrix control 165 that any of the cross points involved should be closed. In view of the fast scanning times provided within the system for scanning the lines and junctors, it can be seen that a misoperation of a cross point will be immediately corrected so that no effect upon any communication connection through the matrix will result, nor will such cross point misoperation be noticeable to either party except for a click as the cross point is opened or closed to correct the state thereof. Further details concerning the unique operation of the matrix under control of the line scanner 130, line selector 155 and matrix control 165 are disclosed in our copending application Ser. No. 431,878, filed Jan. 9, 1974, now U.S. Pat. No. 3,903,374, which application is assigned to the same assignee as the present application.

When the control circuit 110 receives an indication through the class of service buffer 125 that the line circuit 15a has requested service, the control circuits 110, which include a junctor allotter, will assign a free junctor to the line circuit and request that the calling line number of the line circuit 15a be stored in the junctor memory 140 in the time position assigned to the selected junctor. The control circuits 110 will also address the status circuit 160 to record in the memory thereof that the call associated with the selector junctor is in the first state of operation. Assuming that the junctor allotter in the control circuits 110 selects the local junctor 95a, the calling line number of the line circuit 15a will be stored in the memory position of the junctor memory 140 permanently assigned to the local junctor 95a, and each time the junctors are scanned, the line number of the calling line 15a will be forwarded to the line selector so that the line 15a can be addressed at this time and the cross point associated both with the line 15a and the junctor 95a, i.e., the cross point 12' can be addressed. The status circuit 160 indicates to the matrix control 165 that the call is in a state wherein the cross point 12' should be closed, and therefore the matrix control 165 will forward a positive request for closing the cross point 12' at the time the cross point is addressed. As a result, the line circuit 15a will be connected through the matrix 10 to the local junctor 95a.

At the same time that the cross point 12' is addressed and closed to enable connection between the line circuit 15a and the local junctor 95a, the matrix control 165 under control of the status circuit 160 addresses the cross points of the tone matrix section of the matrix 10 associated with the dial tone generator 68 so that the cross point 12''' will be closed connecting the dial tone generator 68 through the local junctor 95a to the line circuit 15a. The line circuit may then commence to dial the number of the party to which it desires connection.

The control circuits 110 in the common control 100 will advance the status circuit 160 of the particular junctor 95a to state 2 if the calling line circuit has rotary dial equipment or to state 3 if the calling line circuit has tone dial equipment, as determined from the class of service information for that line circuit received from the class of service programmer 47. Each time the junctor 95a is scanned, the number of the calling line circuit 15a will be provided by the junctor memory 140 to the line selector 155 which will address the line permitting the calling bridge relay state to be monitored via the bus 32 and class of service programmer 47 in the common control 100. The digit decoder 150 will accumulate the calling bridge relay states and provide to the control circuits 110 the digit informatiion which will be stored in the memory portion of the junctor memory 140 assigned to the junctor. Eventually, the junctor memory 140 will have stored in the portion thereof assigned to the junctor 95a both the calling and called line numbers.

When it is determined by the timer 120 that the calling line 15a has completed dialing, the control circuits 110 will advance the status circuit 160 to record state 4 in the position of the memory thereof assigned to the junctor 95a. State 4 relates to busy test of the called line circuit. If the called line circuit is found to be busy, the tone matrix section of the matrix 10 is once again addressed from the matrix control 165 to connect busy tone from the generator 68 through the local junctor 95a to the calling line circuit 15a. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95a to the calling line circuit 15a. The control over the tone matrix section of the matrix 10 to provide for connection of dial tone, busy tone, ring back tone and music to the lines through selected junctors is described in greater detail in our copending application Ser. No. 431,885 filed Jan. 9, 1974, now U.S. Pat. No. 3,904,831, which application is assigned to the same assignee as the present application.

The matrix control 165, upon receiving the calling and called line numbers from the junctor memory 140 as the junctor 95a is scanned, will address the cross point 12' and also the cross point associated with the called line, for example, cross point 12" associated with the line 35a. Thus, when the called party answers in response to the applied ringing, he will be connected via cross points 12' and 12" in the matrix 10 to the calling party, and the respective line circuits 35a and 15a will receive ground to maintain cross point bias, as described in connection with FIG. 3, from the local junctor 95a for the duration of the call. At this time, the status circuit 160 is advanced by the control circuits 110 to status 7, indicating to the system that a local call is in progress.

Where the lines are equipped with tone dial equipment, this class of service for the line circuit is indicated to the common control by the class of service programmer 47. In this regard, the class of service programmer 47 typically includes a panel having selected class of service plugs so that the features of the system may be allocated on a per line basis and the information with respect thereto may be provided to the common control. Thus, in addition to providing a path for the calling bridge relay information from the lines, the class of service programmer 47 also submits at this time class of service data concerning the particular line for use by the common control 100.

When a call is in state 3 indicating dialing from tone dial equipment, the common control 100 effects connection via the matrix between the calling line and an available one of the tone receivers 40a through 40n. The tone receiver converts the tone dial into the corresponding binary number, which is received by the common control 100 via bus 32 and placed into the ing and ed memory 140.

Since the operator loop circuits 60a through 60n are merely provided as line appearances at the input of the matrix 10, the functions associated with the operator position are greatly simplified. Because of the fast switching capability of the cross points in the matrix 10, the split functions normally associated with incoming connections to the operator may be performed with the matrix cross points. Thus, special trunk circuits having separate operator access with split tip and ring pairs, as normally required in conventional systems, are not required in the system of the present invention. In addition, since the split functions are performed in the present system within the matrix 10 by selective operation of the cross points, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the junctor controls the cross points for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor upon detection of the request for service in the manner described above by closing the cross point in the matrix 10 common to the line circuit and a selected available local junctor. In the foregoing example, by closing cross point 12', the line circuit 15a can be connected to the local junctor 95a. An addressing of the tone matrix section provides connection of the dial tone generator 68 through cross point 12''' and the local junctor 95a to the line circuit 15a. When dialing commences, the cross point 12''' is released disconnecting dial tone from the line circuit and the dialing impluses are received in the common control 100 via the class of service programmer 47. The digit decoder 150 for outgoing trunk calls will recognize the first digit as a request for access to a trunk circuit and the control circuits 110 will indicate the need to connect to a trunk junctor. The junctor allotter in the control circuits 110 will select an available trunk junctor, for example, junctor 85a connected to the trunk 89n.

As can be seen, with the arrangement of the present invention, many different functions can be performed during the time in which a junctor is being scanned through selective control of various cross points within the matrix 10 under control of the common control 100 during designated time slots of the junctor scan period, as will be described in greater detail in connection with the system timing.

SYSTEM TIMING

Figure 4C:
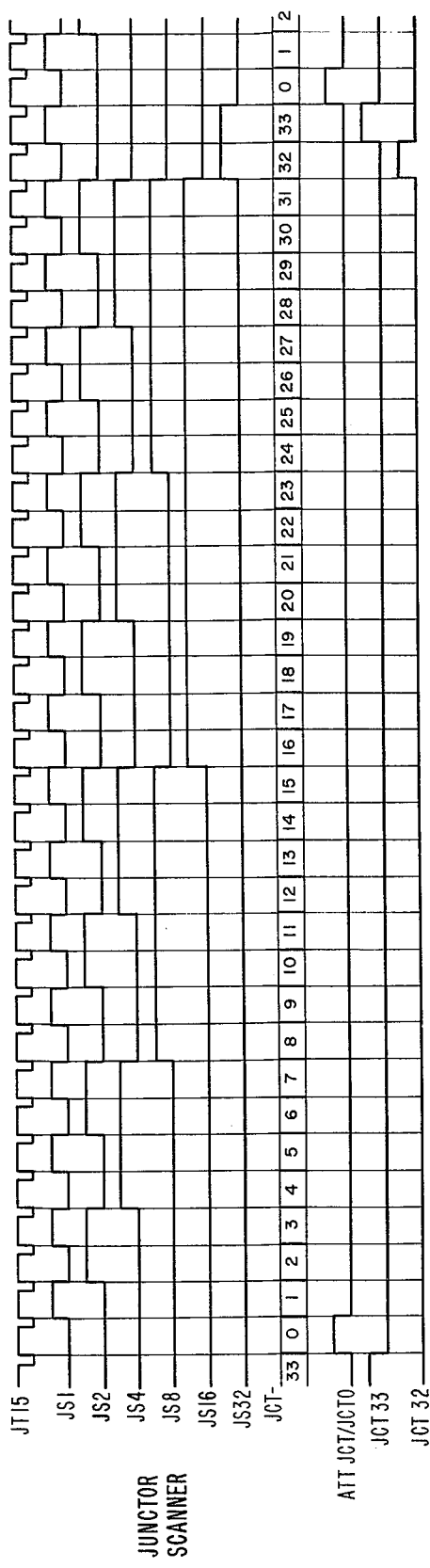
FIGS. 4A through 4C are waveform diagrams of clock signals which are used to control the timing of functions within the system.
Figure 4A:
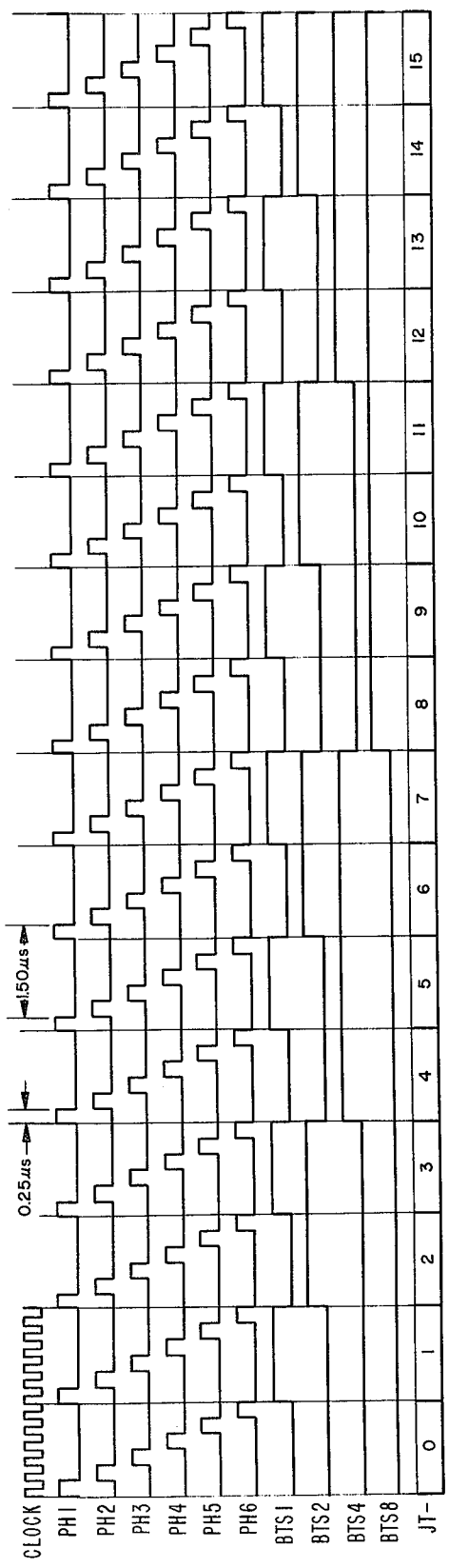
Figure 4B:
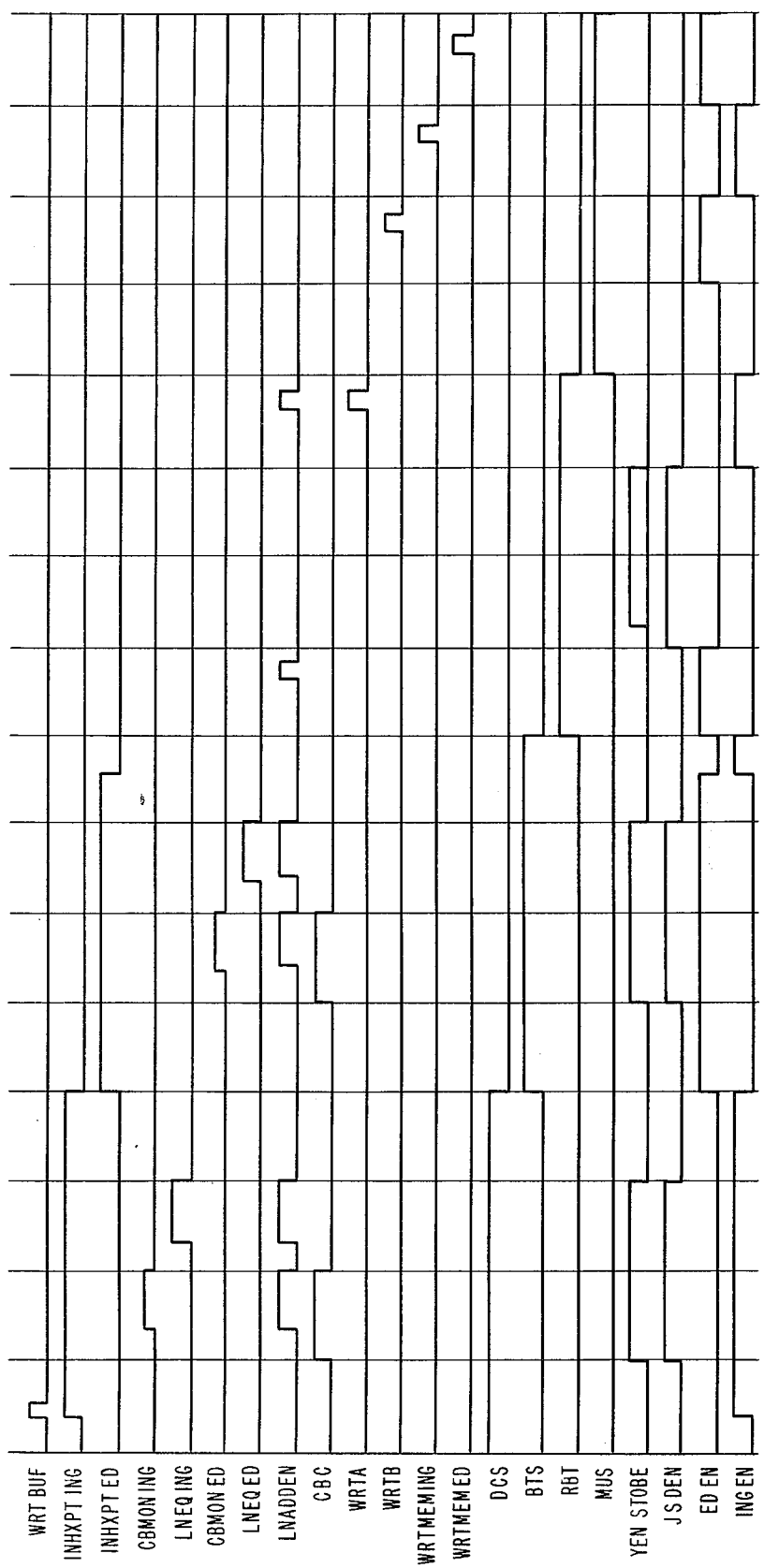

The system timing is controlled by the clock 115 in the common control 100 on the basis of various clock signals such as presented in FIGS. 4a through 4c. Typically, the clock includes a 4 MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the preferred embodiment disclosed in this application, thirty-two junctors are connected to the output of the matrix 10, so that the junctor memory 140 will include thirty-two junctor positions. In addition, the junctor memory 140 also includes positions 32 and 33 which represent time periods during which a scanning of the lines is effected. Thus, after all junctors have been scanned, the line number designated by the line scanner 130 will be addressed during the thirty-two and thirty-three junctor positions to determine whether there is a request for service in connection with that line. Thus, at the end of each 32 time position, the line scanner 130 will be advanced to the next line, with the result that the lines are scanned one at a time at the end of each complete scan of the junctors.

Each junctor time position is subdivided into junctor time slots during which the various functions required in connection with the call associated with the junctor are performed under control of the control circuit 100. During one or more of the time slots of each junctor time, one or more functions may be performed by various elements of the common control as required by the state of the call under control of the control circuits.

The clock 115 is typically formed by a crystal oscillator connected to a divider chain and various decoders to produce the clock signals required for controlling the functions to be performed within the system. FIG. 4a illustrates the output of a 4 MHz crystal oscillator from which phase signals PH1 through PH6 are derived by a clock phase generator producing a division by six of the basic frequency. The output of the clock phase generator is connected to a bit time slot counter effecting a division by sixteen to produce the binary bit 4 time slot signals BTS1 through BTS8. A decoding of the four bit binary time slot signals produces the sixteen junctor time slot signals JT0 through JT15.

Further decoding of the binary bit time slot signals BTS1 to BTS8 also produces various timing signals which are utilized throughout the system. These timing signals which will be utilized in the various common control circuits to be described are illustrated in FIG. 4b in relation to the sixteen junctor time slot signals JT0 through JT15. The function of these timing signals will be described in connection with the description of the detailed operation of the various common control elements.

FIG. 4c illustrates the waveforms which are derived from the junctor scanner portion of the clock. A further division by thirty-four produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals JCT32 and JCT33.

THE STATUS CIRCUIT

The status circuit 160 basically forms a memory including a storage position for each of the junctors to store the state of the call associated with each of the junctors. As already indicated in the general system description, the common control steps progressively through various states during which various operations are performed under control of the control circuits 110 to perform the functions required by the system. To determine what functions need to be performed during each junctor scan, the control circuits 110 determine from the status circuit the state of the call associated with that junctor. As the functions associated with each state are completed, the control circuits 110 advance the status circuit to the next state for the particular junctor involved so that a continuous record of the state of the call associated with each junctor is maintained within the status circuit.

In the status circuit, the memory 200 includes thirty-two junctor positions for the junctors JCT0 through JCT31 as well as the junctor times JCT32 and JCT33. The status of the call associated with each junctor is stored in the junctor times of the memory 200 in binary form, and therefore, an encoder 210 is provided to receive from the control circuits 110 the status signals S01 through S63 and provide the binary equivalents thereof on output lines 133 through 138 to the memory 200. Certain of the status signals S01 through S63 are time shared at the input to the encoder 210 under control of the clock signals JT15 and JT14 from the clock 115. A further input to the encoder 210 from the control circuits 110 is the signal A DAT 0 indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230. The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs 133 through 138 from the encoder, the memory 200 also receives direct codes of status 139 and 140 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals OH01 through OH32 are applied to the operator complex, while the signals H01 through H32 are applied to the matrix control. The signal 038 and 040, which are direct codes of status, are applied to the control circuits 110.

A time zero signal TIM0 is derived from the encoder 210 to indicate to the timer each time a state changes in connection with a given junctor so that the timing functions performed by the timer may be reset to zero.

JUNCTOR MEMORY

The junctor memory 140 includes an ing and ed write command logic circuit 300 which receives various command signals from the control circuits 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register on binary inputs HU1 through HH2, from the line selector on binary inputs LSU1 through LSH2, and from the digit decoder on binary inputs DDU1 through DDH2. In accordance with the commands applied to the logic circuit 300, the line numbers from the hold register, line selector, and digit decoder are gated to the memory 320 on leads 11 through 110 and stored in the memory 320 upon generation of the write command signal WRT from the logic circuit 300.

The commands received from the operator and the control circuits 110 relate to the storing of the calling and called numbers in the proper locations of each junctor portion of the memory. The command $\overline{0ing}$ (H-ing) indicates that the calling number from the hold register is to be stored in the ing number location of the junctor portion of the memory. Similarly, the command $\overline{0ing}$ (H-ed) indicates that the called number from the hold register is to be stored in the ing location associated with the attendant junctor. The command $\overline{ing}(0+ed)$ indicates placing the ed number from the operator in the ing register. The command $\overline{ed}(0+ed)$ indicates a request to place the ed number from the operator in the called portion of the memory. The command $\overline{ing}(LN+D1)$ indicates that the line number from the buffer is to be placed in the calling portion of the memory. The command $\overline{ing}(H-ed)$ indicates that the called number from the hold register is to be placed in the calling portion of the memory. The command $\overline{ed}(DGT\ DCD)$ indicates that the number from the digit decoder is to be placed in the called portion of the memory. The command $\overline{ed}(B-ing + ed)$ indicates that the calling and called line numbers from the buffer are to be inserted in the called portion of the memory. The command $\overline{ed}(H-ing + ed)$ indicates a request that the calling and called numbers from the hold register are to be placed in the called portion of the memory. The command $\overline{ing\ (0)}$ indicates that the number in the calling portion of the memory is to be zeroed. The command $\overline{ed\ (0)}$ indicates that the number in the called portion of the memory is to be zeroed. The command $\overline{ADAT\ (0)}$ indicates that all data is to be zeroed.

The signals from the clock represent the various junctor time slots during which the various commands are to be executed. The clock also provides the binary signals A0 through A38, CS1 and CS2 which represent the memory addresses of the junctor portion corresponding to the junctor times JCT0 through JCT32. These junctor signals control the circulation of the data within the memory 320 so that in combination with the junctor time slots applied from the clock to the logic circuit 300, the data will be inserted into the proper junctor portion of the memory during the proper time.

The output of the memory 320 is provided on leads $\overline{01}$ through $\overline{022}$ to a buffer store 330, which provides binary outputs 01 through 010 representing the calling number and binary outputs 013 through 022 representing the called number to the line selector. A further output ing pres to the control circuits 110 indicates that the calling number is present.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

The hold register 135 serves as a temporary memory for calling and called line numbers and other data generated within the common control for use in controlling the functions required in establishing and maintaining a communication connection in the system. The hold register also performs various comparison functions between line numbers, for example, in conjunction with busy searches, line scanning and other functions where a particular calling or called line number is to be compared with the calling and called line number stored in the junctor memory.

The functions of the hold register are initiated upon receipt of a comparison request signal or a start search signal from the operator or control circuits 110 in the common control 100. The comparison requests signals and the start search signal are applied to an operations logic circuit 400 along with junctor time slot signals JT0 through JT15 from the clock 115. The comparison request commands include the command $\overline{0COMP}$ (ing-ing and ed) indicating a request for comparison of the ing number from the attendant's junctor with all ing and ed numbers stored in the junctor memory. The command $\overline{COMP}$ (ing-ing and ed) indicates a request for a comparison of an ing number with all ing and ed numbers of the junctors other than the attendant junctor. The command $\overline{COMP}$ (ed-ing and ed) indicates a request for comparison of a called number with all calling and called numbers stored in the junctor memory. The command $\overline{COMP}$ (ing-ed) indicates a request for comparison of a calling number to all called numbers. The command $\overline{COMP}$ (ing-ing) indicates a request for comparing a calling number to all calling numbers stored in the junctor memory. The command $\overline{COMP}$ (ed-ed) indicates a request to compare a called number with all called numbers stored in the junctor memory.

The various comparison requests are acted upon during various junctor time slots by the operations logic circuit and result in enabling of a write pulse generator 410, which in turn enables a hold store 450 and an ing and ed store 420. The hold store 450 receives various data relating to flashes, time-outs, whether the call is an incoming or outgoing call, a designation of the station hunting group, etc., for use by various elements of the common control during the course of the following operations.

The ing and ed store 420 in the hold register stores the calling and/or the called line number associated with a particular junctor as received from the line selector on binary inputs LSU1 through LSH2. For example, if the hold register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ing ed store 420. The numbers stored in the ing and ed store 420 is then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. Such a comparison, for example, would form part of the busy search where the system attempts to determine whether a called line is busy by scanning all of the junctor positions in the junctor memory to determine whether that line circuit has its number stored in connection with any other junctor. In this case, the status decoder forming part of the status circuit 160 would provide a signal $\overline{DSO4}$ to the comparator 440 enabling the comparison of the numbers stored in the ing and ed store 420 with all numbers received from the line selector.

Other comparisons which are performed within the hold register relate to the scanning of the lines by the line scanner 130. At the end of each junctor 32 time position the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides outputs which may be required by the control circuits in the common control for various functions. The output ed-COMP indicates that only a comparison of the called number has been detected. The outputs $\overline{COMP\text{-}HS}$ and $\overline{COMP\text{-}H}$ indicates a general comparison detected. The output $\overline{COMP\text{-}B}$ indicates that a comparison of a line with its own number has been detected.

The data control circuit 430 merely serves to multiplex the data which is to be applied to the comparator so as to avoid interference between comparisons associated with data stored in the ing and ed store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (b ing + ed–H ed) is a request to store the calling and called numbers from the buffer in the junctor memory in the called portion of the ing and ed store of the hold register. The signal ST (b ed-H ing) indicates a request to store the called number from the buffer in the junctor memory in the calling portion of the ing and ed store 420 of the hold register. Such transfers of information from one junctor to the other are necessary for various operations and require a holding of this information between junctor scan times so that the transfer from one junctor position to another junctor position in the junctor memory can be effected. This is accomplished in the ing and ed store 420 under control of the write pulse generator 410. The outputs TB and TC provide indications of the transfer operation.

The hold register also includes an end search circuit 460 connected to the operations logic circuit 400 and receiving the control signal ICO and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{END\ SEARCH}$ and 0 $\overline{END\ SEARCH}$ are generated along with a $\overline{CLEAR}$ to effect control of various elements in the common control at the end of the search.

The hold register also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{HBSY}$ and 0 $\overline{HBSY}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{HOLD\ ALARM}$ is generated from the alarm circuit 480.

Figure 9:
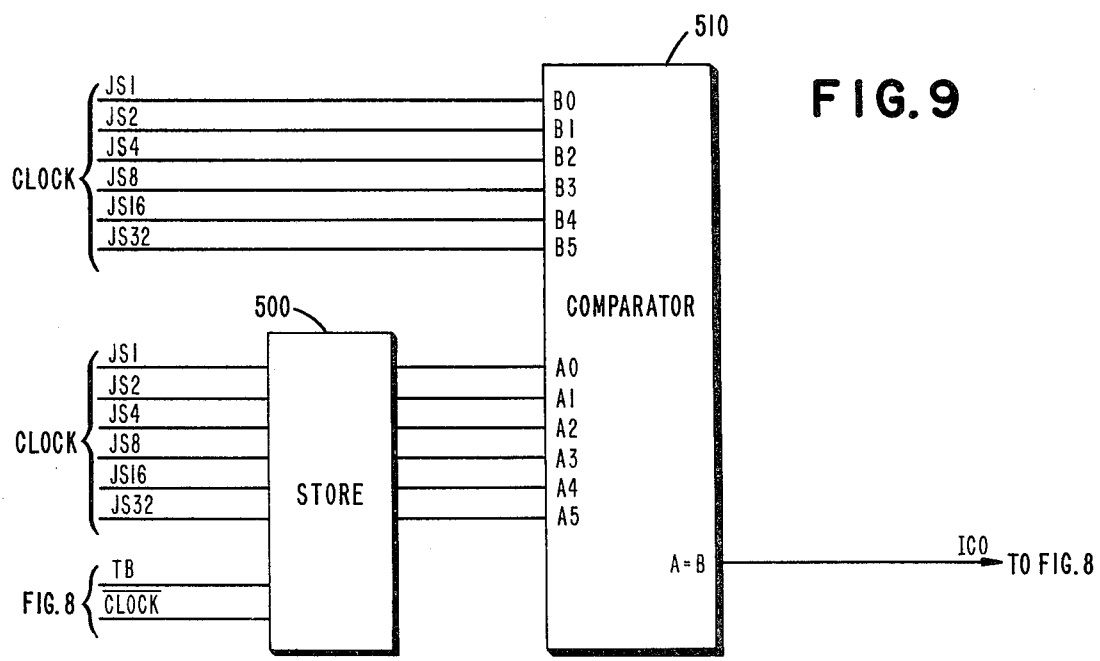
FIG. 9 is a schematic diagram of a circuit providing end-of-search information to the hold register.

The circuit which controls the END SEARCH circuit 460 is illustrated in FIG. 9. At the time a search or comparison request is received in the hold register, the write pulse generator 410 will generate a transfer bit signal TB to enable store 500, which receives the junctor designation on leads JS1 through JS32 from the clock 115 at the time of receipt of the transfer bit TB from the write pulse generator 410 in the hold register. Thus, the junctor number at the time of generation of the signal TB is stored in the store 500.

The number which is stored in the store 500 is continuously applied to a comparator 510 along with the clock signals JS1 through JS32. When the original junctor whose number is stored in the store 500 is scanned once again, the comparator will indicate a comparison between the number generated by the clock and that stored in the store 500 and produce the signal ICO to the END SEARCH circuit 460 in the hold register to indicate that the search has been completed. The signal $\overline{CLEAR}$ from the END SEARCH circuit 460 is then applied to clear the store 500.

THE LINE SELECTOR

The line selector 155 functions to address the lines, including the line circuits, tie trunks and tone receivers, and also addresses the cross points in the matrix 10, in response to information received from the junctor memory 140, the line scanner 130 and the tone receiver and tie trunk control 170. While data is received in the line selector from six different sources requiring addressing of the lines or cross points of the matrix, the line selector functions in six distinct operations during each junctor scan.

Figure 10:
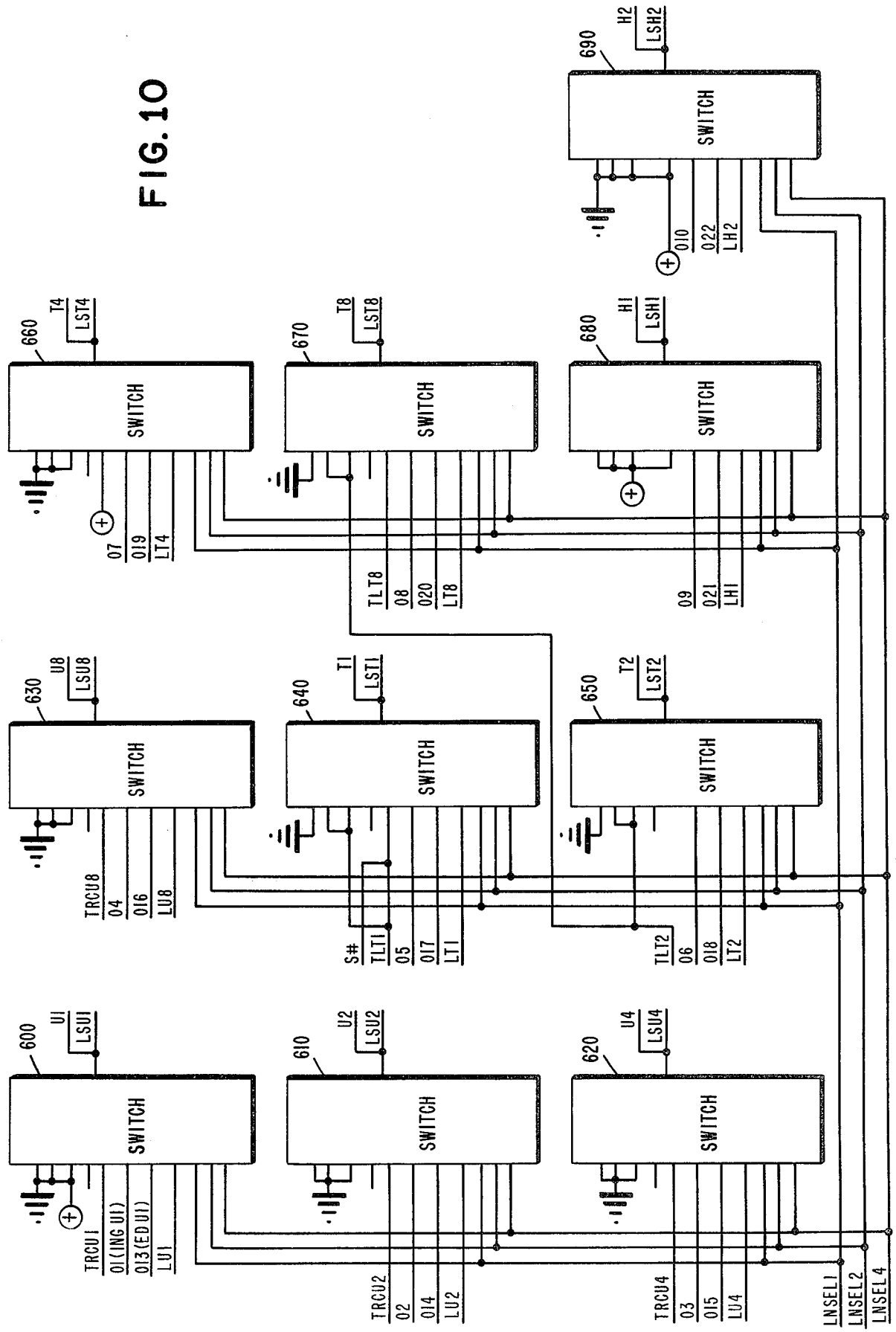
FIG. 10 is a schematic diagram of the selector switch portion of the line selector.

FIG. 10 illustrates the switch portion of the line selector, which includes selector switches 600 through 690. Each selector switch selectively connects one of eight inputs to a single output under control of the binary timing signals LNSEL1, LNSEL 2, and LNSEL 4 from the clock circuit. Thus, for each of the binary states of the clock signals, one of the eight inputs of a selector switch will be connected to the output thereof.

Figure 11:
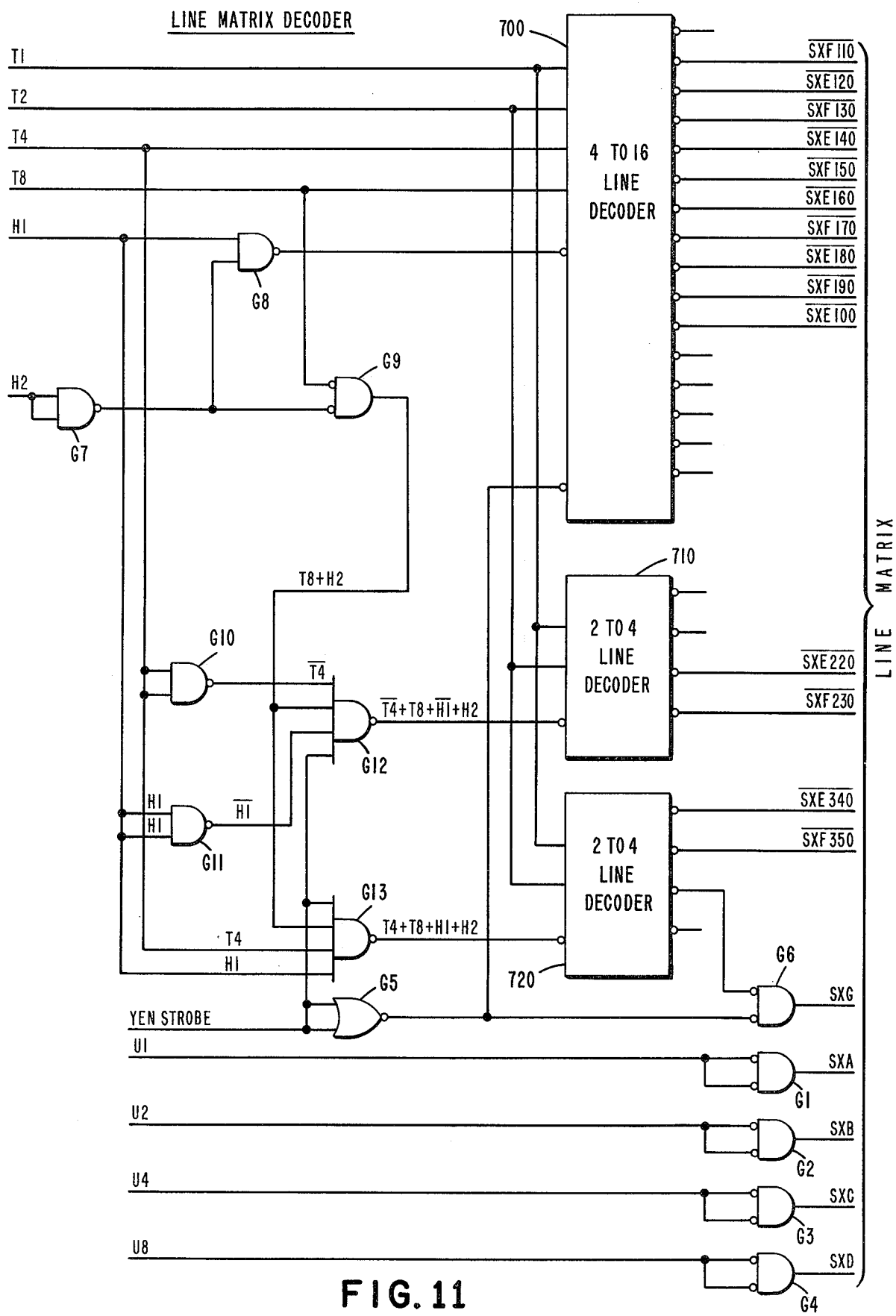
FIG. 11 is a schematic diagram of the line matrix decoder portion of the line selector.

In fact, only five inputs are provided to the switches 600 through 670 and only three inputs are provided to the switches 680 and 690. The five inputs represent data from the five different sources within the common control which require addressing of the lines or cross points. For example, the selector switch 600 receives the signal TRCU1 from the tone receiver control, the signal 01 and 013 representing the units digit of the calling and called numbers, respectively, from the junctor memory 140, TLT1 represents a tens digit from the tie trunk control, and the signal LU1 from the line scanner 130. If the control requires a sender line number, it will make S # high. When S # is low, the switch will deliver the tone receiver line number. These inputs are sequentially connected to the output wherein lead LSU1 is connected to the hold register, junctor memory and the line circuits. The output lead U1 is connected to the line selector decoder portion illustrated in FIG. 11.

During the operation of the line selector the designation of a tone receiver as received from the tone receiver and tie trunk control 170 on leads TRCU1, TRCU2, TRCU4 and TRCU8 are applied to switches 600 through 690 in FIG. 10. The tone receiver designation will be switched to the output of these switches during one phase of the operation of the line selector as determined by the clock signals LNSEL1, LNSEL2 and LNSEL4. During a second operation of the line selector within the same junctor period a calling number received from the junctor memory 140 as inputs 01 through 010 will be connected to the output of the switches 600 through 690. During a third operation within the same junctor period, a called line number from the junctor memory 140 received on leads 013 through 022 will be switched to the output of the switches 600 through 690. During a fourth operation within the same junctor period a line number from the line scanner received on inputs LU1-LU8, LT1-LT8, LH1 and LH2 will be switched to the output of the switches 600 through 690. During a fifth operation, the S # input can change to provide the sender line number at the output of the switches 600 through 690. During a sixth operation within the junctor period, a tie trunk designation received from the tone receiver and tie trunk control 170 will be switched on leads TLT1 - TLT8 to the output of switches 600 through 690.

Thus, it can be seen that during each junctor period as the junctors are being scanned, the line selector 155 is capable of addressing a tone receiver, a sender, a tie trunk line, ing and ed lines and designated cross points in the matrix 10 in six separate operations under control of the clock signals LNSEL1 through LNSEL4. The output signals from the selector switches 600 through 690 on leads LSU1, LSU2, LSU4, LSU8, LST1, LST2, LST4, LST8, LSH1 and LSH2 are applied to the hold register and junctor memory, and these outputs are also applied to the multiline interface 14 to address the individual lines. The outputs U1, U2, U4, U8, T1, T2, T4, T8, H1 and H2 from the selector switches are applied to the line selector decoder illustrated in FIG. 11.

The line selector decoder portion serves to generate address signals for the matrix cross points associated with particular lines and junctors. The decoder portion basically consists of line decoders 700, 710 and 720. The binary units designations U1 through U8 received from the selector switches are applied directly through non-inverting AND gates G1 through G4 to the line matrix on output lines SXA through SXD. A clock signal YEN STROBE is applied through gate G5 in control of the line decoder 700 and is also applied through gate G6 along with an output from the line decoder 720 on lead SXG to the line matrix. The line decoder 700 receives the tens binary signals T1 through T8 from the line selector switches and decodes these signals into outputs $\overline{SXF110}$ through $\overline{SXE100}$. Various combinations of the tens and hundreds binary designations from the line selector switches are applied through logic gates G7 through G13 to the line decoder 710 and 720 to produce the outputs $\overline{SXE220}$ through $\overline{SXF350}$ for control of the line matrix.

MATRIX CONTROL

The matrix control works in conjunction with the line selector to control the status of the cross points in the matrix in connection with all functions in the system. As already described, the line selector responds to information received from the line scanner 130, junctor memory 140 and tone receiver and tie trunk control 170 to address various cross points in the matrix 10. As also described in connection with the general description of the matrix, simple addressing of a cross point in the matrix drives the cross point open in the absence of a request control signal from the matrix control 165 indicating that the cross point in question is to be closed. The matrix control receives information from the status circuit 160 concerning the status of the particular call and information from the operator complex concerning the call as well as timing signals from the clock 115 to determine whether a cross point should be open or closed.

Figure 12:
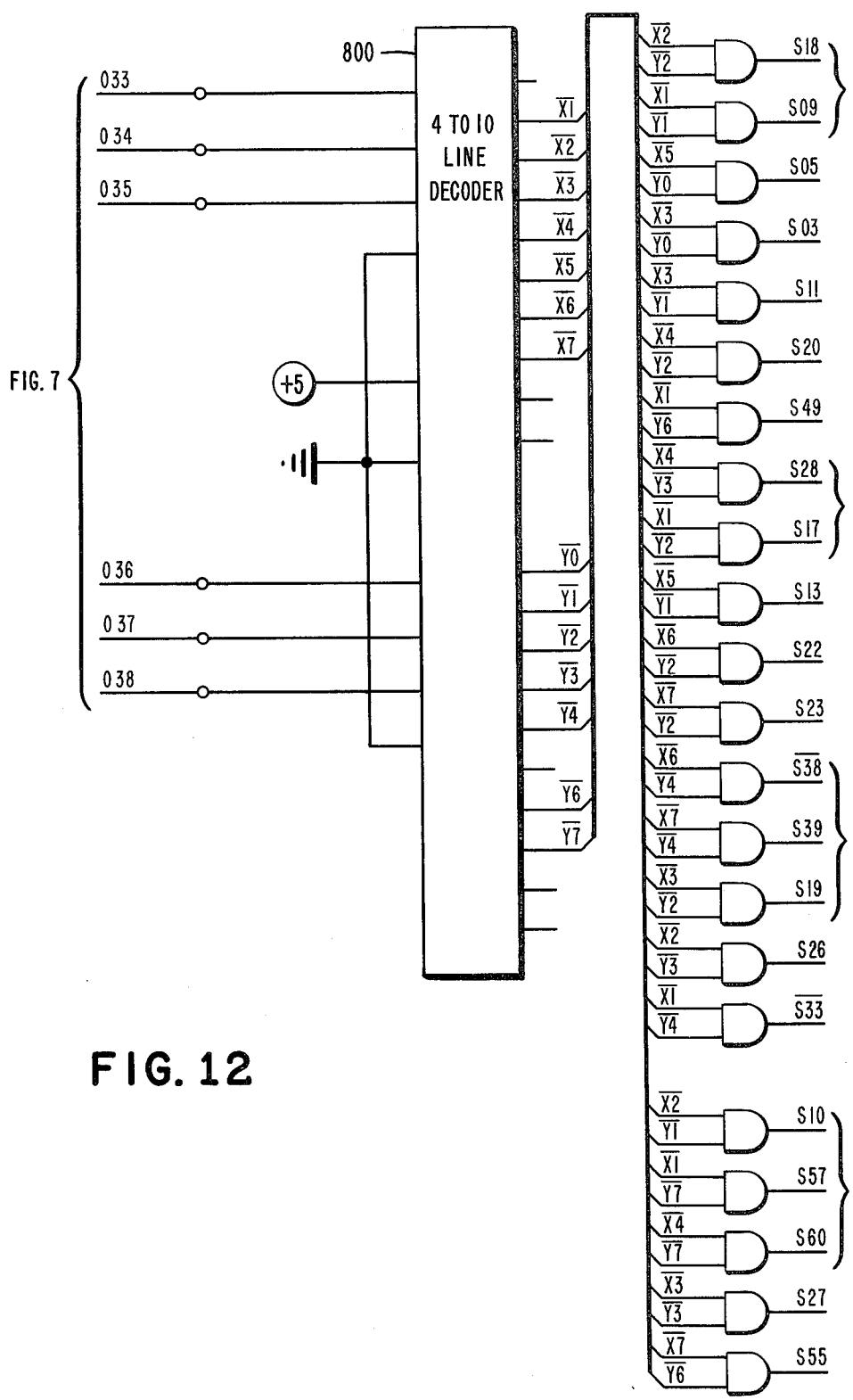
FIG. 12 is a schematic diagram of the status decoder portion of the matrix control.

FIG. 12 illustrates a general decoding arrangement wherein the status of a particular call is received on binary inputs 033 through 038 from the status circuit 160. The decoder 800 decodes the binary indications to provide outputs representing various states during which an addressing of the matrix cross points is required.

FIG. 13a provides the logic circuitry which serves to generate a request for addressing the calling and called cross points in the memory. A direct request for addressing the cross points received as a signal XPT (inged) from the status circuit 160 is applied through OR gate G20 as the address request signal $\overline{\text{A XPT}}$ (ing-ed). The same address output is provided during state S13 via AND gate G21 and OR gate G20 in absence of a signal $\overline{\text{OP SEND BUSY}}$ from the operator complex indicating that the operator sender is busy. An output is also provided from OR gate G20 in response to an indication from the class of service buffer 125 that the line has a tone dial class of service indicated by signal COSTD during state S33, which produces an output from gate G22 via gate G23 to the OR gate G20. A further condition providing an output from OR gate G20 results during an indication from the class of service buffer 125 that the line has a transfer class of service, as indicated by the signal $\overline{\text{COS XFR}}$ at the input of AND gate G25 during either states S18 or S20, as indicated by an output from gate G24 to the other input of gate G25.

Figure 13B:
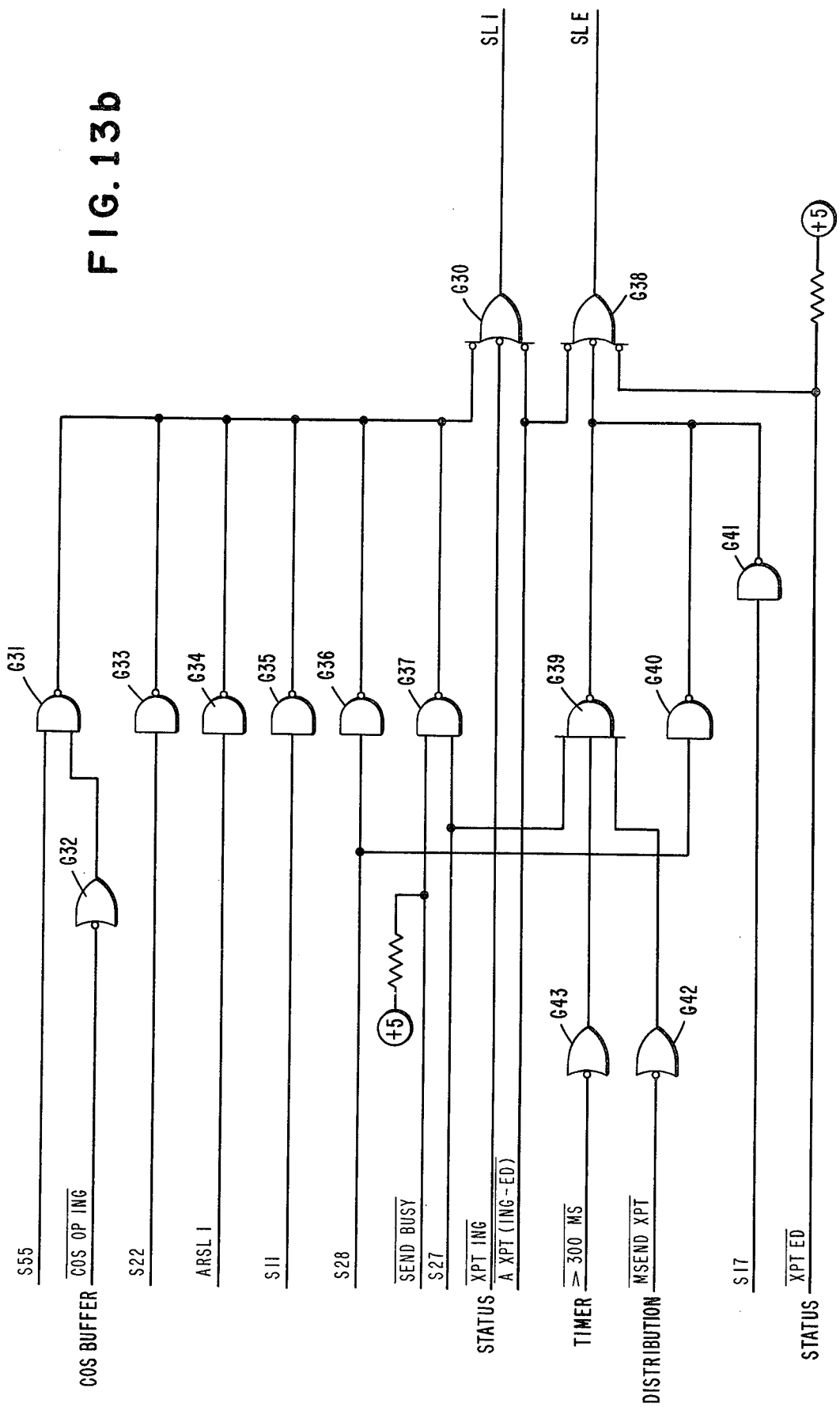

FIG. 13b represents the logic circuitry which serves to generate the control signals SLI and SLE, which are decoded, as seen in FIG. 14, to produce various control and timing signals including the line selector control signals LNSEL1, LNSEL2 and LNSEL4, the function of which is described in connection with the line selector switches in FIG. 10.

In FIG. 13b, the output SLI is provided at the output of gate G30 under various conditions which serve to enable gates G31, G33, G34, G35, G36 and G37. For example, during state 55 when the class of service buffer indicates that the operator is a calling party via gate G32, G31 will be enabled to provide an output from gate G30. The states S22, S11 and S28 also will provide an enabling via gates G33, G35 and G36 of the gate G30. The signal ARSLI from FIG. 13e represents a combination of states and trunk conditions which serve to enable gate G34 to provide an output from gate G30. A sender busy signal $\overline{\text{SEND BUSY}}$ applied to gate G37 during state S27 also provides an enabling of the gate G30.

The state circuit, as seen in FIG. 6, provides an instruction for addressing the calling party cross point in the matrix by a signal $\overline{\text{XPT ING}}$, which is applied to gate G30 to generate the signal SLI. In conjunction with the addressing of the calling cross point, the status circuit also generates a request for addressing the called cross point by a signal $\overline{\text{XPT ED}}$ applied to enable gate G38 to produce the signal SLE. The request for addressing the calling and called cross points in the matrix derived from the circuitry of FIG. 13a is also applied to both the gates G30 and G38 to produce both of the signals SLI and SLE. The gate G38 is also enabled during state S28 and states S17 via gates G40 and G41. During state S28, when a signal for making the sender cross point $\overline{\text{MSEND XPT}}$ is received via gate G42 along with a timing signal $\overline{\text{300 MS}}$ via gate G43, the AND gate G39 will be enabled to enable gate G38 to produce the signal SLE.

Figure 5:
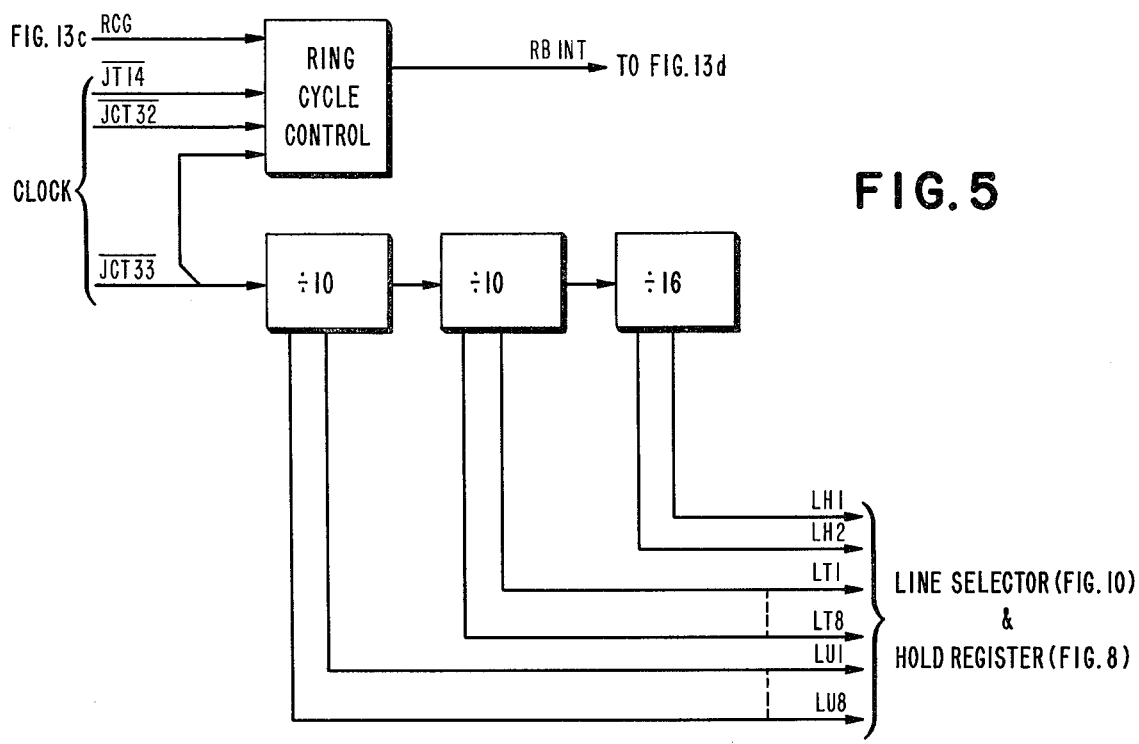
FIG. 5 is a schematic diagram of the line scanner circuit and ring cycle control.

FIG. 13c provides the matrix control circuitry which controls the ringing relays in each of the line circuits during the proper time as controlled by the clock signals $\overline{\text{JT11}}$, $\overline{\text{JT8}}$ and $\overline{\text{JT1}}$. The various states which require control of the ringing relay are applied to a selector 810 which is responsible to the timer control signal 042 and 048 to selectively generate the ring control signal RCG, which is applied in control of the ring cycle control circuit, as seen in FIG. 5.

The combination of the output from the selector 810 and the various clock signals produce the ring control signals $\overline{\text{RCS1}}$ through $\overline{\text{RCS3}}$ and $\overline{\text{RCR1}}$ through $\overline{\text{RCR3}}$. These signals are applied to the ring relay of all of the line circuits in common; however, ringing is applied to only the line circuit which is being addressed, as will be understood from the foregoing description.

Figure 13D:
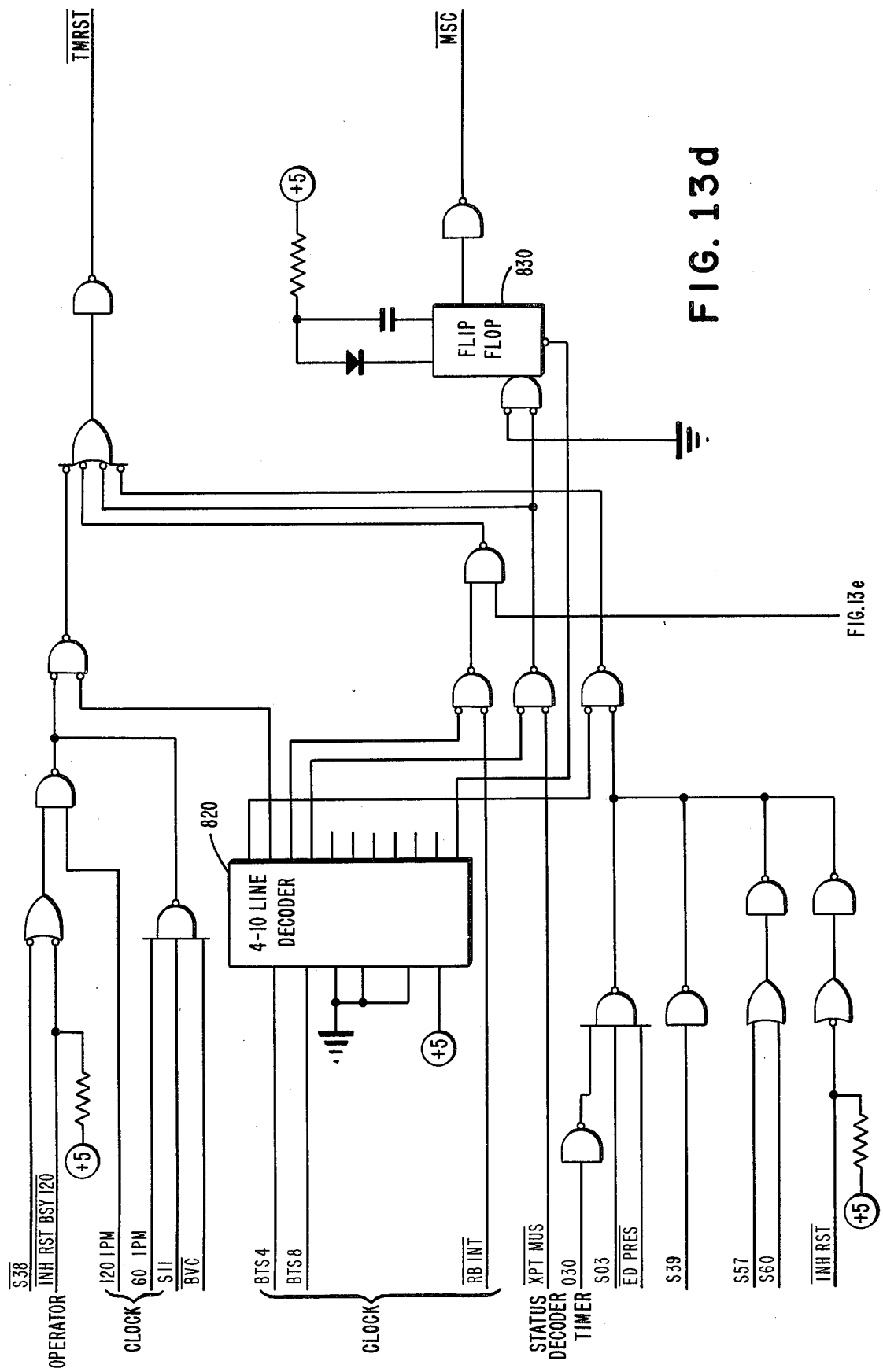

FIG. 13d provides the matrix control circuitry which generates the tone matrix control signal $\overline{\text{TMRST}}$ and the music source control signal $\overline{\text{MSC}}$. The tone matrix control signal is generated during various states which require application of a tone, such as dial tone, busy tone, camp-on tone or ring back tone, through the tone matrix to one of the lines. The generation of the tone matrix control signal is effected during the proper time under control of various clock signals applied to the circuit of FIG. 13d. The music source control 830 is responsive to the various states and the timing of the clock signals to produce a signal which will effect application of the music tone to the tone matrix for application to the lines, for example, during camp-on or when a line is on hold. The details of the control circuit of FIG. 13d are disclosed more particularly in our copending U.S. Application Ser. No. 431,885, filed Jan. 9, 1974, now U.S. Pat. No. 3,904,831, which is directed to the tone matrix and its control.

CONTROL CIRCUITS

The control circuits 110 in the common control are wired logic circuits which serve to control the functioning of the various other elements of the common control during particular times regulated by the clock 115 and in response to the various conditions of a call as determined from the class of service buffer 125, data stored in the digit decoder 115 and junctor memory 140, and the status of the call as stored in the status circuit 160. Since the control circuits 110 are merely wired logic circuits performing various functions as required of the overall system, the configuration of these circuits necessarily will vary in dependence upon the functions which are required. However, as an example of a preferred embodiment of the present invention, various logic circuits which control basic functions which are fundamental to such a system will be described generally.

As can be seen from FIGS. 15 through 23, the control circuits 110 merely comprise a plurality of gates which combine various timing signals and condition signals received from the clock and from the various other elements of the common control to provide instructions for the performance of various operations during each state of the call. Forr example, in FIG. 15 a signal RSO1 recognizes an initial off-hook condition requiring a state 01 in a connection with a particular line. The various logic gates combine clock signals designating junctor times 32 and 33, clock phase signal $\overline{\text{PH5}}$, junctor time slot $\overline{\text{JT2}}$ and junctor time slot $\overline{\text{JT0}}$. Information is also received from the class of service buffer such as the signal $\overline{\text{ING OFF-H}}$ indicating an off-hook condition in the calling line circuit and the signal $\overline{\text{COS ETO}}$ indicating called line traffic only. The signal $\overline{\text{COS OP}}$ from the class of service buffer designates the operator and the signal $\overline{\text{J FREE}}$ from the junctors indicates that a junctor is free.

Figure 17:
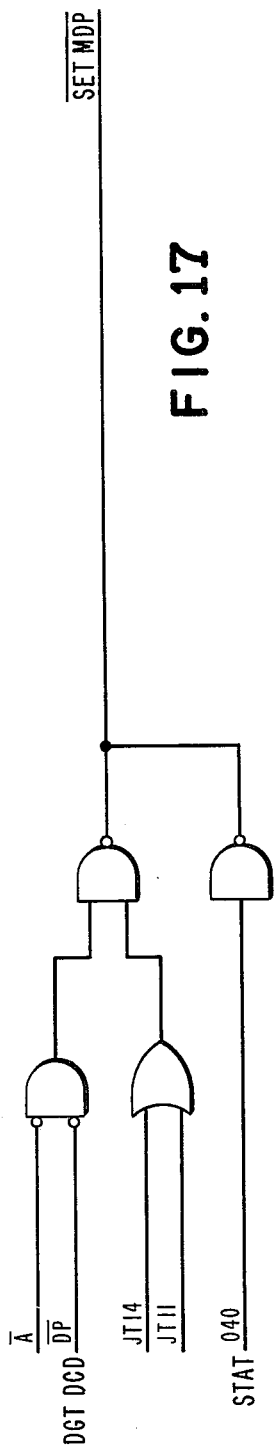
Figure 18:
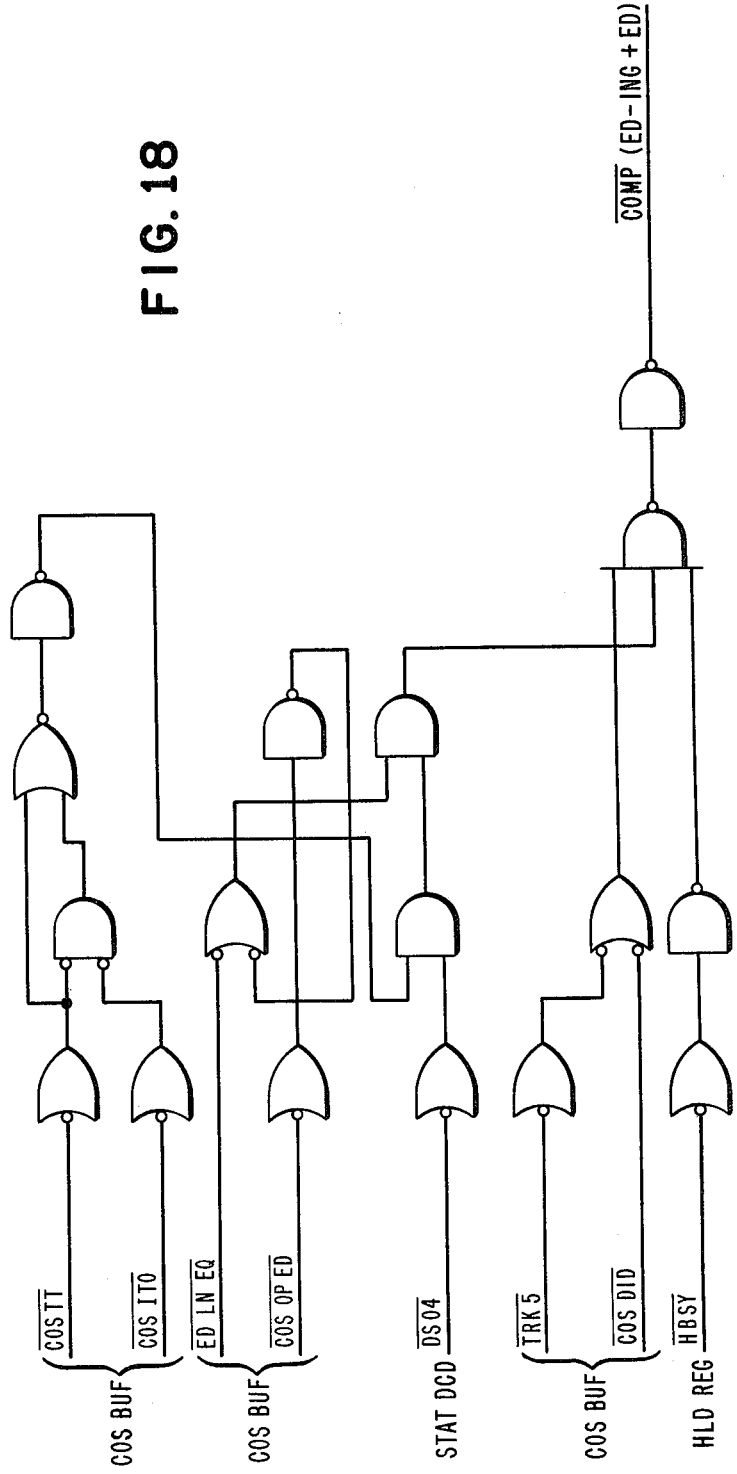

The circuitry of FIG. 16a serves to generate various state signals which are forwarded to the status circuit 160 as well as a comparison circuit which is forwarded to the hold register 135. FIG. 16b provides further circuitry for generating various comparison signals forwarded to the hold register and the signal $\overline{\text{SO1}}$ in response to receipt of the signal RSO1 from FIG. 15 indicating to the status circuit that a state 01 representing an initial off-hook condition is to be stored. FIG. 17 provides for generation of an instruction signal 140 to the status circuit 160 from information received from the digit decoder. FIG. 18 also provides a circuit for generation of a comparison signal to be forwarded to the hold register in FIG. 8.

FIG. 19 provides a circuit which generates the state signals SO2 or SO3 depending upon whether the calling line has rotary dial or tone dial equipment, as determined from the class of service buffer. The status circuit indicates the previous state by signal $\overline{\text{DSO1}}$ to determine whether the system will advance to the SO2 state for dial pulse dialing or to the So3 state for receipt of tone dial. In the case of tone dial equipment, the line circuit is to be connected to a tone receiver, and so an output SO3 is not provided unless an indication is received via the signal $\overline{\text{TRCV FREE}}$ indicating a free tone receiver is available.

Figure 8:
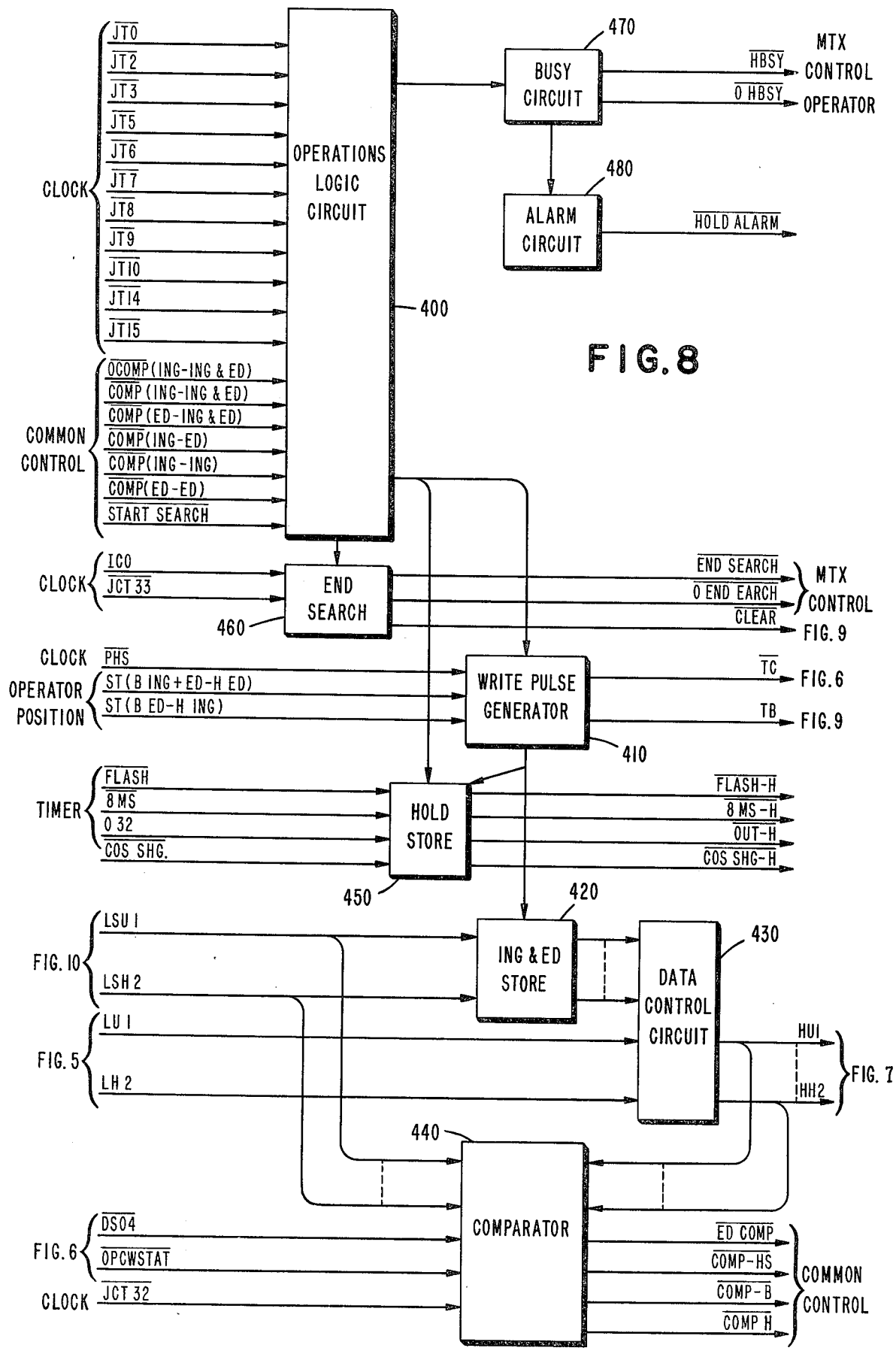
FIG. 8 is a schematic block diagram of the hold register.
Figure 21:
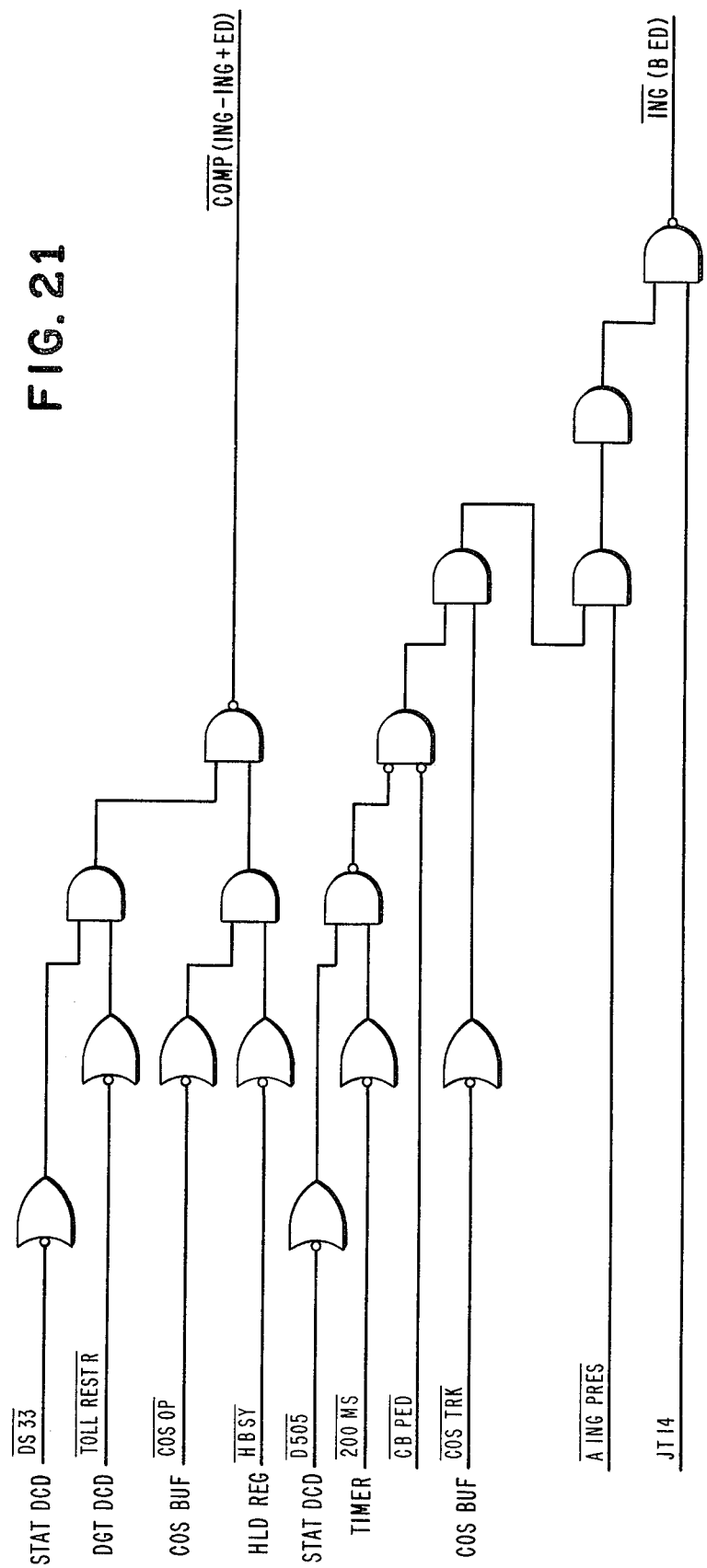

FIGS. 20 and 21 provide the circuits which generate the comparison signals $\overline{\text{COMP}}$ (ing-ing+ed) and $\overline{\text{ING}}$ (B ED) which are forwarded to the hold register in FIG. 8 and the junctor memory in FIG. 7, respectively. Once again, a combination of various information from the system along with various timing signals from the clock circuit provide for the generation of these signals as apparent from FIGS. 20 and 21.

FIG. 22 provides a circuit which generates a start search signal forwarded to the hold register for initiating a search in connection with a night service connection. This circuit merely provides for recognition of the state DSO8 relating to night search and a recognition that the hole register is not busy.

The command signals which are received in the junctor memory, as seen in FIG. 7, are generated in a circuit such as illustrated in FIG. 23. These are commands in addition to the command which is generated by the circuitry in FIG. 21 and represents the typical manner in which data and timing signals are combined in the control circuits to provide the commands necessary during various states of the call.

As quite apparent from the foregoing description, additional control circuits can be provided to perform more complicated and sophisticated functions within the system; however, once the functions which are to be performed by the various common control elements described in this specification have been determined, the logic circuitry necessary to request and control the functions can be provided without inventive effort by one of skill in this particular art. The circuits illustrated in FIGS. 15 through 23 provide control circuitry associated with the basic operating states of the system including initial off-hook, dial pulse dialing or tone dialing, busy test and ringing. Expansion of the functions to be performed by the system may therefore be carried out in the same manner as evidenced by the circuits illustrated in FIGS. 15 through 23.

While We have shown and described one embodiment in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What is claimed is:

1. An electronic telephone system comprising a plurality of input circuits including line circuits and operator loop circuits, a plurality of junctor circuits, a switching matrix in the form of a rectangular array of horizontal and vertical lines and switch means for selectively effecting interconnection between a horizontal line and a vertical line at the crosspoint thereof in response to receipt of a command signal, said input circuits being connected to respective horizontal lines and said junctor circuits being connected to respective vertical lines, said switching means comprising a line matrix section and a service matrix section, the input circuits connected to said line matrix section comprising subscriber line circuits and the input circuits connected to said service matrix section comprising register sender circuits and operator loop circuits, common control means for generating command signals to periodically close one or more selected crosspoints of said switching matrix to connect an input circuit to a junctor or to connect an input circuit to another input circuit and to a junctor, and signaling means directly connecting said input circuits to said common control means for transmitting all signals relating to input circuit conditions to said common control means independently of said switching matrix.

2. An electronic telephone system as defined in claim 1 wherein said line circuits and operator loop circuits are connected as line appearances directly to respective horizontal lines of said switching matrix.

3. An electronic telephone system as defined in claim 1 wherein the input circuits connected to said service matrix section further comprise a plurality of tone receivers and an operator line circuit.

4. An electronic telephone system as defined in claim 1 wherein a plurality of said junctor circuits are connected directly to trunk circuits extending lines to other telephone systems.

5. An electronic telephone system as defined in claim 4, further including tone generating means connected to each of said junctors for applying dial tone and ringback tone to said input circuits through said switching matrix.

6. An electronic telephone system as defined in claim 5 wherein said input circuits include line circuits and operator loop circuits.

7. An electronic telephone system as defined in claim 6 wherein said common control means includes ringing generator means connected directly to said line circuits for applying ringing current thereto.

8. An electronic telephone system as defined in claim 7 wherein said common control means further includes line scanner means for sequentially addressing said line circuits and means for detecting in said addressed line circuits a request for connection of the line circuits through said switching matrix to a junctor.

9. An electronic telephone system comprising a plurality of input circuits, a plurality of junctor circuits, a switching matrix in the form of a rectangular array of horizontal and vertical lines and switch means for selectively effecting interconnection between a horizontal line and a vertical line at the crosspoint thereof in response to receipt of a command signal, said input circuits being connected to respective horizontal lines and said junctor circuits being connected to respective vertical lines, said switching matrix comprising a line matrix section and service matrix section, the input circuits connected to said line matrix section comprising subscriber line circuits and the input circuits connected to said service matrix section comprising register sender circuits and operator loop circuits, common control means for generating command signals to close one or more selected crosspoints of said switching matrix to connect an input circuit to a junctor or to connect an input circuit to another input circuit and to a junctor, and signaling means directly connecting said input circuits to said common control means for transmitting all signals relating to input circuit conditions to said common control independently of said switching matrix.

10. An electronic telephone system as defined in claim 9 wherein said input circuits include a plurality of line circuits and said common control means includes line scanner means for sequentially addressing said line circuits to apply to said signaling means signals representing the line condition of each line circuit addressed.

11. An electronic telephone system as defined in claim 10 wherein said signaling means includes class-of-service means responsive to receipt of a line condition signal from an addressed line circuit for forwarding to said common control means class-of-service information relating to the addressed line circuit.

12. An electronic telephone system as defined in claim 10 wherein said common control means further includes digit decoder means responsive to said line condition signals from a calling line circuit for identifying a called line circuit to be connected to said calling line circuit and matrix control means for generating command signals to close crosspoints in said switching matrix associated with said calling and called line circuits and a junctor circuit.

13. An electronic telephone system as defined in claim 9 wherein the input circuits connected to said service matrix section further comprise a plurality of tone receivers and an operator line circuit.

14. An electronic telephone system as defined in claim 13 wherein a plurality of said junctor circuits are connected directly to trunk circuits extending lines to other telephone systems.

15. An electronic telephone system as defined in claim 14, further including tone generating means connected to each of said junctors for applying dial tone and ring-back tone to said input circuits through said switching matrix.

16. An electronic telephone system as defined in claim 9 wherein said common control means includes ringing generator means connected directly to said line circuits for applying ringing current thereto.

17. An electronic telephone system as defined in claim 10 wherein said common control means further includes memory means for storing data representing the status of each line circuit connection for the line circuits connected to each junctor and control circuit means responsive to the line condition signals and the data stored in said memory means for controlling the switch means in said switching matrix.

18. An electronic telephone system comprising a plurality of line circuits, a plurality of junctor circuits, a switching matrix in the form of a rectangular array of horizontal and vertical lines and switch means for selectively effecting interconnection between a horizontal line and a vertical line at the crosspoint thereof in response to receipt of a command signal, said line circuits being connected to respective horizontal lines and said junctor circuits being connected to respective vertical lines, and common control means for generating command signals to close one or more selected crosspoints of said switching matrix to connect a line circuit to a junctor or to connect a calling line circuit to a called line circuit and to a junctor, said common control means including junctor memory means having a memory portion assigned to each junctor for storing the identity of each calling and called line circuit connected to a junctor through said switching matrix and matrix control means for continuously scanning the contents of said junctor memory means and generating command signals to periodically close the crosspoints of said switching matrix associated with the line circuits requiring connection to a junctor or another line circuit.

19. An electronic telephone system as defined in claim 18 wherein said common control means further includes status means for storing data representing the status of each line circuit connection for the line circuits connected to each junctor and control circuit means responsive to the data stored in said status means for controlling said matrix control means to periodically close selected crosspoints in said switching matrix.

20. An electronic telephone system as defined in claim 19 wherein said common control means further includes line scanner means for sequentially addressing said line circuits and means for detecting in said addressed line circuits a request for connection of the line circuits through said switching matrix to a junctor.

21. An electronic telephone system as defined in claim 20 wherein said common control means further includes line selector means responsive to said junctor memory means and said line scanner means for applying addressing signals to the switch means of said switching matrix associated with designated line circuits and junctors, said switch means including control means responsive to said addressing signals alone to open said crosspoints and responsive to said addressing signals and said command signal for closing said crosspoints.

22. An electronic telephone system as defined in claim 21, further including signaling means directly connecting said line circuits to said common control means for transmitting signals relating to line circuit conditions to said common control.

23. An electronic telephone system as defined in claim 22 wherein said common control means further includes digit decoder means responsive to said line condition signals from a calling line circuit for identifying a called line circuit to be connected to said calling line circuit.

24. An electronic telephone system as defined in claim 23 wherein said signaling means includes class-of-service means responsive to receipt of a line condition signal from an addressed line circuit for forwarding to said common control means class-of-service information relating to the addressed line circuit.

25. An electronic telephone system as defined in claim 18, further including tone generating means connected to each of said junctors for applying dial tone and ring-back tone to said input circuits through said switching matrix.

26. An electronic telephone system as defined in claim 25 wherein said common control means includes ringing generator means connected directly to said line circuits for applying ringing current thereto.

27. An electronic telephone system as defined in claim 26 wherein a plurality of said junctor circuits are connected directly to trunk circuits extending lines to other telephone systems.

28. An electronic telephone system comprising a plurality of input circuits, a plurality of junctor circuits, a switching matrix in the form of a rectangular array of horizontal and vertical lines and a solid state crosspoint switch interconnecting said horizontal and vertical lines at each crosspoint thereof in response to receipt of both an address signal and a command signal, said input circuits being connected to respective horizontal lines and said junctor circuits being connected to respective vertical lines, and common control means for generating address signals and command signals to close one or more selected crosspoint switches to connect an input circuit to a junctor or to connect an input circuit to another input circuit and to a junctor.

29. An electronic telephone system as defined in claim 28 wherein said switching matrix comprises a line matrix section and a service matrix section, the input circuits connected to said line matrix section comprising subscriber line circuits and the input circuits connected to said service matrix section comprising register sender circuits and operator loop circuits.

30. An electronic telephone system as defined in claim 28 wherein a plurality of said junctor circuits are connected directly to trunk circuits extending lines to other telephone systems.

31. An electronic telephone system as defined in claim 28 wherein said common control means includes junctor memory means having a memory portion assigned to each junctor for storing the identity of each calling and called line circuit connected to a junctor through said switching matrix, and matrix control means for continuously scanning the contents of said junctor memory means and generating command signals to close the crosspoint switches associated with line circuits requiring connection to a junctor or another line circuit.

32. An electronic telephone system as defined in claim 31 wherein said common control means further includes status means for storing data representing the status of each line circuit connection for the line circuits connected to each junctor and control circuit means responsive to the data stored in said status means for controlling said matrix control means to periodically close selected crosspoints in said switching matrix in conjunction with the scanning of said junctor memory means.

33. An electronic telephone system as defined in claim 32 wherein said common control means further includes line scanner means for sequentially addressing said line circuits and means for detecting in said addressed line circuits a request for connection of the line circuits through said switching matrix to a junctor.

34. An electronic telephone system as defined in claim 33 wherein said common control means further includes line selector means responsive to said junctor memory means and said line scanner means for applying addressing signals to the switch means of said switching matrix associated with designated line circuits and junctors, said switch means including control means responsive to said addressing signals alone to open said crosspoints and responsive to said addressing signals and said command signal for closing said crosspoint.

35. An electronic telephone system as defined in claim 34, further including signaling means directly connecting said line circuits to said common control means for transmitting signals relating to line circuit conditions to said common control means.

36. An electronic telephone system as defined in claim 35 wherein said common control means further includes digit decoder means responsive to said line condition signals from a calling line circuit for identifying a called line circuit to be connected to said calling line circuit.

37. An electronic telephone system as defined in claim 36 wherein said signaling means includes class-of-service means responsive to receipt of a line condition signal from an addressed line circuit for forwarding to said common control means class-of-service information relating to the addressed line circuit.

* * * * *